(12) United States Patent
Merrill et al.

(10) Patent No.: US 8,777,323 B2
(45) Date of Patent: Jul. 15, 2014

(54) RESTRAINT HARNESSES AND ASSOCIATED METHODS OF USE AND MANUFACTURE

(75) Inventors: David T. Merrill, Scottsdale, AZ (US); Michael J. Walton, Phoenix, AZ (US); Zulma Y. Estrada, Avondale, AZ (US)

(73) Assignee: AmSafe, Inc., Phoenix, AZ (US)

( * ) Notice: Subject to any disclaimer, the term of this patent is extended or adjusted under 35 U.S.C. 154(b) by 242 days.

(21) Appl. No.: 13/187,265

(22) Filed: Jul. 20, 2011

(65) Prior Publication Data

US 2012/0019043 A1    Jan. 26, 2012

Related U.S. Application Data

(60) Provisional application No. 61/366,045, filed on Jul. 20, 2010, provisional application No. 61/375,205, filed on Aug. 19, 2010.

(51) Int. Cl.
| | | |
|---|---|---|
| *B60R 22/14* | (2006.01) | |
| *B60R 22/12* | (2006.01) | |
| *B64D 25/06* | (2006.01) | |
| *A62B 35/00* | (2006.01) | |

(52) U.S. Cl.
CPC ............. *B60R 22/14* (2013.01); *A62B 35/0006* (2013.01); *B64D 25/06* (2013.01)
USPC ........ 297/484; 297/483; 297/485; 280/801.1; 280/808; 180/268

(58) Field of Classification Search
USPC ......... 297/464, 465, 468, 474, 480, 483, 484, 297/486; 280/748, 801.1, 801.2, 806, 807, 280/808; 180/268, 271, 274, 282
See application file for complete search history.

(56) References Cited

U.S. PATENT DOCUMENTS

| 906,045 | A | | 12/1908 | Miller | |
|---|---|---|---|---|---|
| 1,079,080 | A | | 11/1913 | Ward | |
| 1,369,456 | A | * | 2/1921 | Meredith | 119/770 |

(Continued)

FOREIGN PATENT DOCUMENTS

| CA | 2038505 | 9/1991 |
|---|---|---|
| CA | 2091526 | 10/1993 |

(Continued)

OTHER PUBLICATIONS

Britax, "COMPAQ: Convertible Car Seats." Buckle Image. Accessed Oct. 12, 2010. (2 pages). This has been publicly available for at least one year prior to this application's filing date.

(Continued)

*Primary Examiner* — Paul N Dickson
*Assistant Examiner* — Barry Gooden, Jr.
(74) *Attorney, Agent, or Firm* — Perkins Coie LLP

(57) ABSTRACT

Various embodiments of restraint harnesses for use in land, air, and sea vehicles are described herein. In one embodiment, for example, a restraint harness can include a first shoulder web, a second shoulder web, and a torso web. A first end portion of the torso web can include a buckle that is configured to engage a connector at a second, opposite end portion of the torso web. The restraint harness can further include first and second portions of a stiffening material attached to first and second portions of the first and second shoulder webs, respectively. The stiffening material can form the first and second shoulder webs into preformed openings with inverted U-like shapes.

21 Claims, 11 Drawing Sheets

(56) References Cited

U.S. PATENT DOCUMENTS

| | | |
|---|---|---|
| 1,438,898 A | 12/1922 | Carpmill |
| 1,816,262 A * | 7/1931 | Ritter ............................ 297/484 |
| 1,930,378 A * | 10/1933 | Beagan ......................... 297/484 |
| 2,132,556 A * | 10/1938 | Blackshaw .................... 297/484 |
| 2,372,557 A * | 3/1945 | Dowd ........................ 244/151 R |
| 2,437,585 A * | 3/1948 | Zimmern ....................... 297/468 |
| 2,482,693 A * | 9/1949 | Rogers et al. .................. 244/148 |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,710,999 A | 6/1955 | Davis |
| 2,763,451 A | 9/1956 | Moran |
| 2,803,864 A | 8/1957 | Bishaf |
| 2,845,233 A * | 7/1958 | Wrighton et al. ........... 242/382.6 |
| 2,846,745 A | 8/1958 | Lathrop |
| 2,869,200 A | 1/1959 | Phillips et al. |
| 2,876,516 A | 3/1959 | Cummings |
| 2,892,232 A | 6/1959 | Quilter |
| 2,893,088 A | 7/1959 | Harper et al. |
| 2,899,732 A | 8/1959 | Cushman |
| 2,901,794 A | 9/1959 | Prete, Jr. |
| 2,938,254 A | 5/1960 | Gaylord |
| 2,964,815 A | 12/1960 | Sereno |
| 2,965,942 A | 12/1960 | Carter |
| 3,029,487 A | 4/1962 | Asai |
| 3,084,411 A | 4/1963 | Lindblad |
| 3,091,010 A | 5/1963 | Davis |
| 3,104,440 A | 9/1963 | Davis |
| 3,110,071 A | 11/1963 | Higuchi |
| 3,118,208 A | 1/1964 | Wexler |
| 3,137,907 A | 6/1964 | Unai |
| D198,566 S | 7/1964 | Holmberg |
| 3,142,103 A | 7/1964 | Lindblad |
| 3,145,442 A | 8/1964 | Brown |
| 3,165,805 A | 1/1965 | Lower |
| 3,178,226 A * | 4/1965 | Cates ............................ 297/484 |
| 3,179,992 A | 4/1965 | Murphy, Sr. |
| 3,183,568 A | 5/1965 | Gaylord |
| 3,189,963 A | 6/1965 | Warner et al. |
| 3,218,685 A | 11/1965 | Atumi |
| 3,226,791 A | 1/1966 | Carter |
| 3,233,941 A | 2/1966 | Selzer |
| 3,256,576 A | 6/1966 | Klove, Jr. et al. |
| 3,262,169 A | 7/1966 | Jantzen |
| 3,287,062 A | 11/1966 | Board |
| 3,289,261 A | 12/1966 | Davis |
| 3,293,713 A | 12/1966 | Gaylord |
| 3,306,662 A * | 2/1967 | Finnigan ....................... 297/482 |
| 3,312,502 A | 4/1967 | Coe |
| 3,369,842 A | 2/1968 | Adams et al. |
| 3,380,776 A * | 4/1968 | Dillender ...................... 297/484 |
| 3,414,947 A | 12/1968 | Holmberg et al. |
| 3,428,029 A * | 2/1969 | Klickstein et al. ............ 297/484 |
| 3,451,720 A | 6/1969 | Makinen |
| 3,491,414 A | 1/1970 | Stoffel |
| 3,505,711 A | 4/1970 | Carter |
| 3,523,342 A | 8/1970 | Spires |
| D218,589 S | 9/1970 | Lohr et al. |
| 3,564,672 A | 2/1971 | McIntyre |
| 3,576,056 A | 4/1971 | Barcus |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,658,281 A | 4/1972 | Gaylord |
| 3,673,645 A | 7/1972 | Burleigh et al. |
| 3,678,542 A | 7/1972 | Prete, Jr. |
| 3,695,696 A | 10/1972 | Lohr et al. |
| 3,714,684 A | 2/1973 | Gley |
| 3,744,102 A | 7/1973 | Gaylord |
| 3,744,103 A | 7/1973 | Gaylord |
| 3,760,464 A | 9/1973 | Higuchi |
| 3,766,611 A | 10/1973 | Gaylord |
| 3,766,612 A | 10/1973 | Hattori |
| 3,775,813 A | 12/1973 | Higuchi |
| 3,825,979 A | 7/1974 | Jakob |
| 3,827,716 A * | 8/1974 | Vaughn et al. ............. 280/730.1 |
| 3,856,351 A | 12/1974 | Garvey |
| 3,879,810 A | 4/1975 | Prete, Jr. et al. |
| 3,898,715 A | 8/1975 | Balder |
| 3,935,618 A | 2/1976 | Fohl et al. |
| 3,964,138 A | 6/1976 | Gaylord |
| 3,986,234 A | 10/1976 | Frost et al. |
| 3,995,885 A | 12/1976 | Plesniarski |
| 4,018,399 A | 4/1977 | Rex |
| 4,026,245 A * | 5/1977 | Arthur ........................... 297/465 |
| 4,051,743 A | 10/1977 | Gaylord |
| 4,095,313 A | 6/1978 | Piljay et al. |
| D248,618 S | 7/1978 | Anthony |
| 4,100,657 A | 7/1978 | Minolla et al. |
| 4,118,833 A | 10/1978 | Knox et al. |
| 4,128,924 A | 12/1978 | Happel et al. |
| 4,136,422 A | 1/1979 | Ivanov et al. |
| 4,148,224 A | 4/1979 | Craig |
| 4,181,832 A | 1/1980 | Ueda et al. |
| 4,184,234 A | 1/1980 | Anthony et al. |
| 4,185,363 A | 1/1980 | David |
| 4,196,500 A | 4/1980 | Happel et al. |
| 4,220,294 A | 9/1980 | DiPaola |
| 4,228,567 A | 10/1980 | Ikesue et al. |
| 4,239,260 A | 12/1980 | Hollowell |
| 4,253,623 A | 3/1981 | Steger et al. |
| 4,262,396 A | 4/1981 | Koike et al. |
| 4,273,301 A | 6/1981 | Frankila |
| 4,302,049 A | 11/1981 | Simpson |
| 4,317,263 A | 3/1982 | Fohl et al. |
| 4,321,734 A | 3/1982 | Gandelman |
| 4,334,341 A | 6/1982 | Krautz et al. |
| 4,336,636 A | 6/1982 | Ishiguro et al. |
| 4,366,604 A | 1/1983 | Anthony et al. |
| 4,385,425 A | 5/1983 | Tanaka et al. |
| 4,408,374 A | 10/1983 | Fohl et al. |
| 4,419,874 A | 12/1983 | Brentini et al. |
| 4,425,688 A | 1/1984 | Anthony et al. |
| 4,457,052 A | 7/1984 | Hauber |
| 4,487,454 A | 12/1984 | Biller |
| 4,491,343 A | 1/1985 | Fohl et al. |
| 4,525,901 A | 7/1985 | Krauss |
| 4,545,097 A | 10/1985 | Wier et al. |
| 4,549,769 A | 10/1985 | Pilarski |
| 4,555,831 A | 12/1985 | Otzen et al. |
| 4,569,535 A | 2/1986 | Haglund et al. |
| D285,383 S | 9/1986 | Anthony |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hakansson et al. |
| 4,644,618 A | 2/1987 | Holmberg et al. |
| 4,646,400 A | 3/1987 | Tanaka et al. |
| 4,648,483 A | 3/1987 | Skyba |
| 4,650,214 A | 3/1987 | Higbee |
| 4,651,946 A | 3/1987 | Anthony et al. |
| 4,656,700 A | 4/1987 | Tanaka et al. |
| 4,660,889 A | 4/1987 | Anthony et al. |
| 4,679,852 A | 7/1987 | Anthony et al. |
| 4,682,791 A | 7/1987 | Ernst et al. |
| 4,685,176 A | 8/1987 | Burnside et al. |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,726,625 A | 2/1988 | Bougher |
| 4,727,628 A | 3/1988 | Rudholm et al. |
| 4,733,444 A | 3/1988 | Takada |
| 4,738,485 A | 4/1988 | Rumpf |
| 4,741,574 A | 5/1988 | Weightman et al. |
| 4,742,604 A | 5/1988 | Mazelsky |
| D296,678 S | 7/1988 | Lortz et al. |
| 4,757,579 A | 7/1988 | Nishino et al. |
| 4,758,048 A | 7/1988 | Shuman |

(56) References Cited

U.S. PATENT DOCUMENTS

| | | | |
|---|---|---|---|
| 4,766,654 A | 8/1988 | Sugimoto | |
| 4,786,078 A * | 11/1988 | Schreier et al. | 280/808 |
| 4,790,597 A | 12/1988 | Bauer et al. | |
| 4,809,409 A | 3/1989 | Van Riesen et al. | |
| 4,832,410 A | 5/1989 | Bougher | |
| 4,843,688 A | 7/1989 | Ikeda et al. | |
| 4,854,607 A * | 8/1989 | Mandracchia et al. | 280/801.1 |
| 4,854,608 A | 8/1989 | Barral et al. | |
| D303,232 S | 9/1989 | Lortz et al. | |
| 4,876,770 A | 10/1989 | Bougher | |
| 4,876,772 A | 10/1989 | Anthony et al. | |
| 4,884,652 A | 12/1989 | Vollmer | |
| 4,911,377 A | 3/1990 | Lortz et al. | |
| 4,919,484 A | 4/1990 | Bougher et al. | |
| 4,927,211 A * | 5/1990 | Bolcerek | 297/465 |
| 4,934,030 A | 6/1990 | Spinosa et al. | |
| 4,940,254 A | 7/1990 | Ueno et al. | |
| 4,942,649 A | 7/1990 | Anthony et al. | |
| 4,995,640 A | 2/1991 | Saito et al. | |
| 5,015,010 A | 5/1991 | Homeier et al. | |
| 5,023,981 A | 6/1991 | Anthony et al. | |
| 5,026,093 A | 6/1991 | Nishikaji | |
| 5,029,369 A | 7/1991 | Oberhardt et al. | |
| 5,031,962 A | 7/1991 | Lee | |
| 5,038,446 A | 8/1991 | Anthony et al. | |
| 5,039,169 A | 8/1991 | Bougher et al. | |
| 5,046,687 A * | 9/1991 | Herndon | 244/122 AG |
| 5,054,815 A | 10/1991 | Gavagan | |
| 5,067,212 A | 11/1991 | Ellis | |
| 5,074,011 A | 12/1991 | Carlson | |
| 5,074,588 A | 12/1991 | Huspen | |
| 5,084,946 A | 2/1992 | Lee | |
| 5,088,160 A | 2/1992 | Warrick | |
| 5,088,163 A | 2/1992 | van Riesen | |
| 5,097,572 A | 3/1992 | Warrick | |
| D327,455 S | 6/1992 | Blair | |
| 5,119,532 A | 6/1992 | Tanaka | |
| 5,123,147 A | 6/1992 | Blair | |
| 5,123,673 A * | 6/1992 | Tame | 280/801.1 |
| 5,142,748 A | 9/1992 | Anthony et al. | |
| 5,159,732 A | 11/1992 | Burke | |
| 5,160,186 A | 11/1992 | Lee | |
| 5,170,539 A | 12/1992 | Lundstedt et al. | |
| D332,433 S | 1/1993 | Bougher | |
| 5,176,402 A | 1/1993 | Coulon | |
| 5,182,837 A | 2/1993 | Anthony et al. | |
| 5,219,206 A | 6/1993 | Anthony et al. | |
| 5,219,207 A | 6/1993 | Anthony et al. | |
| 5,220,713 A | 6/1993 | Lane, Jr. et al. | |
| D338,119 S | 8/1993 | Merrick | |
| 5,234,181 A | 8/1993 | Schroth | |
| 5,236,220 A | 8/1993 | Mills | |
| 5,248,187 A | 9/1993 | Harrison | |
| D342,465 S | 12/1993 | Anthony et al. | |
| 5,267,377 A | 12/1993 | Gillis et al. | |
| 5,269,051 A | 12/1993 | McFalls | |
| 5,272,770 A * | 12/1993 | Allen et al. | 2/421 |
| 5,282,672 A | 2/1994 | Borlinghaus | |
| 5,282,706 A | 2/1994 | Anthony et al. | |
| 5,283,933 A | 2/1994 | Wiseman et al. | |
| 5,286,057 A | 2/1994 | Forster | |
| 5,286,090 A | 2/1994 | Templin et al. | |
| 5,292,181 A | 3/1994 | Dybro | |
| 5,301,371 A * | 4/1994 | Chao | 2/102 |
| 5,308,148 A | 5/1994 | Peterson et al. | |
| 5,311,653 A | 5/1994 | Merrick | |
| 5,350,195 A | 9/1994 | Brown | |
| 5,350,196 A * | 9/1994 | Atkins | 280/808 |
| 5,369,855 A | 12/1994 | Tokugawa | |
| 5,370,333 A | 12/1994 | Lortz et al. | |
| 5,375,879 A | 12/1994 | Williams et al. | |
| 5,380,066 A | 1/1995 | Wiseman et al. | |
| 5,392,535 A | 2/1995 | Van Noy et al. | |
| 5,397,171 A * | 3/1995 | Leach | 297/484 |
| 5,403,038 A | 4/1995 | McFalls | |
| 5,406,681 A | 4/1995 | Olson | |
| 5,411,292 A | 5/1995 | Collins et al. | |
| D359,710 S | 6/1995 | Chinni et al. | |
| 5,432,987 A | 7/1995 | Schroth | |
| 5,435,272 A * | 7/1995 | Epstein | 119/770 |
| 5,443,302 A | 8/1995 | Dybro | |
| 5,451,094 A | 9/1995 | Templin et al. | |
| D364,124 S | 11/1995 | Lortz et al. | |
| 5,471,714 A | 12/1995 | Olson | |
| 5,495,646 A | 3/1996 | Scrutchfield et al. | |
| 5,497,956 A | 3/1996 | Crook | |
| 5,511,856 A | 4/1996 | Merrick et al. | |
| 5,516,199 A | 5/1996 | Crook et al. | |
| 5,526,556 A | 6/1996 | Czank | |
| 5,540,403 A * | 7/1996 | Standley | 244/122 B |
| 5,560,565 A | 10/1996 | Merrick et al. | |
| 5,561,891 A | 10/1996 | Hsieh | |
| 5,566,431 A | 10/1996 | Haglund | |
| 5,568,676 A | 10/1996 | Freeman | |
| 5,570,933 A | 11/1996 | Rouhana et al. | |
| 5,579,785 A * | 12/1996 | Bell | 128/875 |
| 5,584,107 A | 12/1996 | Koyanagi et al. | |
| 5,588,189 A | 12/1996 | Gorman et al. | |
| 5,606,783 A | 3/1997 | Gillis et al. | |
| 5,622,327 A | 4/1997 | Heath et al. | |
| 5,628,548 A | 5/1997 | Lacoste | |
| 5,634,664 A | 6/1997 | Seki et al. | |
| 5,669,572 A | 9/1997 | Crook | |
| 5,695,243 A | 12/1997 | Anthony et al. | |
| 5,699,594 A | 12/1997 | Czank et al. | |
| D389,426 S | 1/1998 | Merrick et al. | |
| 5,722,689 A | 3/1998 | Chen et al. | |
| 5,743,597 A | 4/1998 | Jessup et al. | |
| 5,765,774 A | 6/1998 | Maekawa et al. | |
| 5,774,947 A | 7/1998 | Anscher | |
| 5,779,319 A | 7/1998 | Merrick | |
| D397,063 S | 8/1998 | Woellert et al. | |
| 5,788,281 A | 8/1998 | Yanagi et al. | |
| 5,788,282 A | 8/1998 | Lewis | |
| 5,794,878 A | 8/1998 | Carpenter et al. | |
| 5,813,097 A | 9/1998 | Woellert et al. | |
| 5,839,793 A | 11/1998 | Merrick et al. | |
| 5,857,247 A | 1/1999 | Warrick et al. | |
| 5,873,599 A | 2/1999 | Bauer et al. | |
| 5,873,635 A | 2/1999 | Merrick | |
| 5,882,084 A | 3/1999 | Verellen et al. | |
| D407,667 S | 4/1999 | Homeier | |
| 5,908,223 A | 6/1999 | Miller | |
| 5,915,630 A | 6/1999 | Step | |
| 5,928,300 A | 7/1999 | Rogers et al. | |
| 5,934,760 A | 8/1999 | Schroth | |
| D416,827 S | 11/1999 | Anthony et al. | |
| 5,979,026 A | 11/1999 | Anthony | |
| 5,979,982 A | 11/1999 | Nakagawa | |
| 5,996,192 A | 12/1999 | Haines et al. | |
| 6,003,899 A | 12/1999 | Chaney | |
| 6,017,087 A | 1/2000 | Anthony et al. | |
| 6,056,320 A | 5/2000 | Khalifa et al. | |
| 6,065,367 A | 5/2000 | Schroth | |
| 6,065,777 A | 5/2000 | Merrick | |
| 6,123,388 A | 9/2000 | Vits et al. | |
| 6,182,783 B1 | 2/2001 | Bayley | |
| RE37,123 E | 4/2001 | Templin et al. | |
| 6,224,154 B1 * | 5/2001 | Stoki | 297/339 |
| 6,230,370 B1 | 5/2001 | Nelsen | |
| 6,260,884 B1 | 7/2001 | Bittner et al. | |
| 6,295,700 B1 | 10/2001 | Plzak | |
| 6,309,024 B1 | 10/2001 | Busch | |
| 6,312,015 B1 | 11/2001 | Merrick et al. | |
| 6,315,232 B1 | 11/2001 | Merrick | |
| 6,322,140 B1 | 11/2001 | Jessup et al. | |
| 6,322,149 B1 * | 11/2001 | Conforti et al. | 297/482 |
| 6,325,412 B1 | 12/2001 | Pan | |
| 6,328,379 B1 | 12/2001 | Merrick et al. | |
| 6,343,841 B1 | 2/2002 | Gregg et al. | |
| 6,357,790 B1 | 3/2002 | Swann et al. | |
| 6,363,591 B1 | 4/2002 | Bell et al. | |
| 6,367,882 B1 | 4/2002 | Van Druff et al. | |
| 6,374,168 B1 | 4/2002 | Fujii | |

(56) References Cited

U.S. PATENT DOCUMENTS

| | | | |
|---|---|---|---|
| 6,400,145 B1 | 6/2002 | Chamings et al. | |
| 6,412,863 B1 | 7/2002 | Merrick et al. | |
| 6,418,596 B2 | 7/2002 | Haas | |
| 6,425,632 B1 | 7/2002 | Anthony et al. | |
| 6,442,807 B1 | 9/2002 | Adkisson | |
| 6,446,272 B1 | 9/2002 | Lee | |
| 6,463,638 B1 | 10/2002 | Pontaoe | |
| 6,467,849 B1 | 10/2002 | Deptolla | |
| 6,485,057 B1 | 11/2002 | Midorikawa et al. | |
| 6,485,098 B1 | 11/2002 | Vits et al. | |
| 6,508,515 B2 | 1/2003 | Vits et al. | |
| 6,513,208 B1 | 2/2003 | Sack et al. | |
| 6,520,392 B2 | 2/2003 | Thibodeau et al. | |
| 6,543,101 B2 | 4/2003 | Sack et al. | |
| 6,547,273 B2 | 4/2003 | Grace et al. | |
| 6,560,825 B2 | 5/2003 | Maciejczyk | |
| 6,566,869 B2 | 5/2003 | Chamings et al. | |
| 6,588,077 B2 | 7/2003 | Katsuyama et al. | |
| 6,592,149 B2 | 7/2003 | Sessoms | |
| 6,606,770 B1 | 8/2003 | Badrenas Buscart | |
| 6,619,753 B2 | 9/2003 | Takayama | |
| 6,631,926 B2 | 10/2003 | Merrick et al. | |
| 6,665,912 B2 | 12/2003 | Turner et al. | |
| 6,694,577 B2 | 2/2004 | Di Perrero | |
| 6,711,790 B2 | 3/2004 | Pontaoe | |
| 6,719,233 B2 | 4/2004 | Specht et al. | |
| 6,719,326 B2 | 4/2004 | Schroth et al. | |
| 6,722,601 B2 | 4/2004 | Kohlndorfer et al. | |
| 6,722,697 B2 | 4/2004 | Krauss et al. | |
| 6,733,041 B2 | 5/2004 | Arnold et al. | |
| 6,739,541 B2 | 5/2004 | Palliser et al. | |
| 6,749,150 B2 | 6/2004 | Kohlndorfer et al. | |
| 6,763,557 B2 | 7/2004 | Steiff et al. | |
| 6,769,157 B1 | 8/2004 | Meal | |
| 6,786,294 B2 | 9/2004 | Specht | |
| 6,786,510 B2 | 9/2004 | Roychoudhury et al. | |
| 6,786,511 B2 | 9/2004 | Heckmayr | |
| 6,793,291 B1 * | 9/2004 | Kocher | 297/464 |
| 6,796,007 B1 | 9/2004 | Anscher | |
| 6,802,470 B2 | 10/2004 | Smithson et al. | |
| 6,820,310 B2 | 11/2004 | Woodard et al. | |
| 6,820,902 B2 * | 11/2004 | Kim | 280/808 |
| 6,834,822 B2 | 12/2004 | Koning et al. | |
| 6,836,754 B2 | 12/2004 | Cooper | |
| 6,840,544 B2 | 1/2005 | Prentkowski | |
| 6,851,160 B2 | 2/2005 | Carver | |
| 6,857,326 B2 | 2/2005 | Specht et al. | |
| 6,860,671 B2 | 3/2005 | Schulz | |
| 6,863,235 B2 | 3/2005 | Koning et al. | |
| 6,863,236 B2 | 3/2005 | Kempf et al. | |
| 6,868,585 B2 | 3/2005 | Anthony et al. | |
| 6,868,591 B2 | 3/2005 | Dingman et al. | |
| 6,871,876 B2 | 3/2005 | Xu | |
| 6,874,819 B2 | 4/2005 | O'Neill | |
| 6,882,914 B2 | 4/2005 | Gioutsos et al. | |
| 6,886,889 B2 | 5/2005 | Vits et al. | |
| 6,896,291 B1 * | 5/2005 | Peterson | 280/808 |
| 6,902,193 B2 * | 6/2005 | Kim et al. | 280/801.1 |
| 6,913,288 B2 | 7/2005 | Schulz et al. | |
| 6,916,045 B2 | 7/2005 | Clancy, III et al. | |
| 6,921,136 B2 | 7/2005 | Bell et al. | |
| 6,922,875 B2 | 8/2005 | Sato et al. | |
| 6,931,669 B2 * | 8/2005 | Ashline | 2/422 |
| 6,935,701 B1 | 8/2005 | Arnold et al. | |
| 6,951,350 B2 | 10/2005 | Heidorn et al. | |
| 6,957,789 B2 | 10/2005 | Bowman et al. | |
| 6,959,946 B2 | 11/2005 | Desmarais et al. | |
| 6,962,394 B2 | 11/2005 | Anthony et al. | |
| 6,966,518 B2 | 11/2005 | Kohlndorfer et al. | |
| 6,969,022 B2 | 11/2005 | Bell et al. | |
| 6,969,122 B2 | 11/2005 | Sachs et al. | |
| 6,993,436 B2 | 1/2006 | Specht et al. | |
| 6,997,474 B2 | 2/2006 | Midorikawa et al. | |
| 6,997,479 B2 | 2/2006 | Desmarais et al. | |
| 7,010,836 B2 | 3/2006 | Acton et al. | |
| D519,406 S | 4/2006 | Merrill et al. | |
| 7,025,297 B2 | 4/2006 | Bell et al. | |
| 7,029,067 B2 | 4/2006 | Vits et al. | |
| 7,040,696 B2 | 5/2006 | Vits et al. | |
| 7,073,866 B1 * | 7/2006 | Berdahl | 297/485 |
| 7,077,475 B2 | 7/2006 | Boyle | |
| 7,080,856 B2 | 7/2006 | Desmarais et al. | |
| 7,100,991 B2 * | 9/2006 | Schroth | 297/468 |
| 7,108,114 B2 | 9/2006 | Mori et al. | |
| 7,118,133 B2 | 10/2006 | Bell et al. | |
| 7,131,667 B2 | 11/2006 | Bell et al. | |
| 7,137,648 B2 | 11/2006 | Schulz et al. | |
| 7,137,650 B2 | 11/2006 | Bell et al. | |
| 7,140,571 B2 | 11/2006 | Hishon et al. | |
| 7,144,085 B2 | 12/2006 | Vits et al. | |
| 7,147,251 B2 | 12/2006 | Bell et al. | |
| D535,214 S | 1/2007 | Kolasa | |
| 7,159,285 B2 | 1/2007 | Karlsson et al. | |
| 7,180,258 B2 | 2/2007 | Specht et al. | |
| 7,182,370 B2 | 2/2007 | Arnold et al. | |
| 7,210,707 B2 * | 5/2007 | Schroth | 280/801.1 |
| 7,216,827 B2 | 5/2007 | Tanaka et al. | |
| 7,219,929 B2 | 5/2007 | Bell et al. | |
| 7,232,154 B2 | 6/2007 | Desmarais et al. | |
| 7,237,741 B2 | 7/2007 | Specht et al. | |
| 7,240,405 B2 | 7/2007 | Webber et al. | |
| 7,240,924 B2 | 7/2007 | Kohlndorfer et al. | |
| 7,246,854 B2 | 7/2007 | Dingman et al. | |
| 7,263,750 B2 | 9/2007 | Keene et al. | |
| 7,278,684 B2 | 10/2007 | Boyle | |
| D555,358 S | 11/2007 | King | |
| 7,300,013 B2 | 11/2007 | Morgan et al. | |
| 7,341,216 B2 | 3/2008 | Heckmayr et al. | |
| 7,360,287 B2 | 4/2008 | Cerruti et al. | |
| 7,367,590 B2 | 5/2008 | Koning et al. | |
| 7,377,464 B2 | 5/2008 | Morgan | |
| 7,384,014 B2 | 6/2008 | Ver Hoven et al. | |
| 7,395,585 B2 | 7/2008 | Longley et al. | |
| 7,404,239 B1 | 7/2008 | Walton et al. | |
| 7,407,193 B2 | 8/2008 | Yamaguchi et al. | |
| D578,931 S | 10/2008 | Toltzman | |
| 7,452,003 B2 | 11/2008 | Bell | |
| 7,455,256 B2 | 11/2008 | Morgan | |
| 7,461,866 B2 | 12/2008 | Desmarais et al. | |
| 7,475,840 B2 | 1/2009 | Heckmayr | |
| 7,477,139 B1 | 1/2009 | Cuevas | |
| 7,481,399 B2 | 1/2009 | Nohren et al. | |
| 7,506,413 B2 | 3/2009 | Dingman et al. | |
| 7,516,808 B2 | 4/2009 | Tanaka | |
| 7,520,036 B1 | 4/2009 | Baldwin et al. | |
| D592,543 S | 5/2009 | Kolasa | |
| 7,533,902 B2 | 5/2009 | Arnold et al. | |
| 7,547,043 B2 | 6/2009 | Kokeguchi et al. | |
| 7,614,124 B2 | 11/2009 | Keene et al. | |
| 7,631,830 B2 | 12/2009 | Boelstler et al. | |
| 7,669,794 B2 | 3/2010 | Boelstler et al. | |
| 7,673,945 B1 * | 3/2010 | Riffel et al. | 297/485 |
| 7,698,791 B2 | 4/2010 | Pezza | |
| 7,722,081 B2 | 5/2010 | Van Druff et al. | |
| 7,739,019 B2 | 6/2010 | Robert et al. | |
| 7,753,410 B2 * | 7/2010 | Coultrup | 280/808 |
| 7,775,557 B2 | 8/2010 | Bostrom et al. | |
| RE41,790 E | 10/2010 | Stanley | |
| 7,861,341 B2 | 1/2011 | Ayette et al. | |
| 7,862,124 B2 | 1/2011 | Dingman | |
| D632,611 S | 2/2011 | Buscart | |
| D637,518 S | 5/2011 | Chen | |
| 7,934,775 B2 * | 5/2011 | Walker et al. | 297/465 |
| 7,945,975 B2 * | 5/2011 | Thomas et al. | 5/81.1 T |
| 8,011,730 B2 * | 9/2011 | Greenwood | 297/344.18 |
| 8,096,027 B2 | 1/2012 | Jung et al. | |
| 8,240,012 B2 | 8/2012 | Walega et al. | |
| 8,240,767 B2 * | 8/2012 | Greenwood | 297/344.18 |
| 2002/0089163 A1 | 7/2002 | Bedewi et al. | |
| 2002/0135175 A1 | 9/2002 | Schroth | |
| 2002/0145279 A1 * | 10/2002 | Murray | 280/801.1 |
| 2003/0015863 A1 | 1/2003 | Brown et al. | |
| 2003/0027917 A1 | 2/2003 | Namiki et al. | |
| 2003/0085608 A1 * | 5/2003 | Girardin | 297/484 |

(56) References Cited

U.S. PATENT DOCUMENTS

| | | | |
|---|---|---|---|
| 2004/0084953 A1* | 5/2004 | Hansen | 297/484 |
| 2004/0169411 A1* | 9/2004 | Murray | 297/486 |
| 2004/0174063 A1* | 9/2004 | Kocher | 297/465 |
| 2004/0217583 A1 | 11/2004 | Wang | |
| 2004/0227390 A1* | 11/2004 | Schroth | 297/468 |
| 2004/0251367 A1 | 12/2004 | Suzuki et al. | |
| 2005/0017567 A1 | 1/2005 | Sachs et al. | |
| 2005/0073187 A1 | 4/2005 | Frank et al. | |
| 2005/0107932 A1 | 5/2005 | Bolz et al. | |
| 2005/0127660 A1 | 6/2005 | Liu | |
| 2005/0179244 A1* | 8/2005 | Schroth | 280/808 |
| 2005/0206151 A1* | 9/2005 | Ashline | 280/801.1 |
| 2005/0284977 A1 | 12/2005 | Specht et al. | |
| 2006/0071535 A1* | 4/2006 | Kim et al. | 297/465 |
| 2006/0075609 A1 | 4/2006 | Dingman et al. | |
| 2006/0097095 A1 | 5/2006 | Boast | |
| 2006/0237573 A1 | 10/2006 | Boelstler et al. | |
| 2006/0243070 A1 | 11/2006 | Van Druff et al. | |
| 2006/0267394 A1 | 11/2006 | David et al. | |
| 2006/0277727 A1 | 12/2006 | Keene et al. | |
| 2007/0080528 A1 | 4/2007 | Itoga et al. | |
| 2007/0241549 A1 | 10/2007 | Boelstler et al. | |
| 2007/0257480 A1 | 11/2007 | Van Druff et al. | |
| 2008/0018156 A1 | 1/2008 | Hammarskjold et al. | |
| 2008/0054615 A1* | 3/2008 | Coultrup | 280/801.1 |
| 2008/0093833 A1 | 4/2008 | Odate | |
| 2008/0100051 A1 | 5/2008 | Bell et al. | |
| 2008/0100122 A1 | 5/2008 | Bell et al. | |
| 2008/0136246 A1* | 6/2008 | Salter | 297/485 |
| 2008/0172847 A1 | 7/2008 | Keene et al. | |
| 2008/0224460 A1* | 9/2008 | Erez | 280/801.1 |
| 2009/0014991 A1* | 1/2009 | Smyth et al. | 280/734 |
| 2009/0069983 A1 | 3/2009 | Humbert et al. | |
| 2009/0183348 A1 | 7/2009 | Walton et al. | |
| 2009/0212549 A1* | 8/2009 | Jones | 280/801.2 |
| 2009/0241305 A1 | 10/2009 | Buckingham | |
| 2010/0115737 A1 | 5/2010 | Foubert | |
| 2010/0125983 A1 | 5/2010 | Keene et al. | |
| 2010/0146749 A1 | 6/2010 | Jung | |
| 2010/0213753 A1 | 8/2010 | Humbert | |
| 2010/0219667 A1* | 9/2010 | Merrill et al. | 297/216.17 |
| 2011/0010901 A1 | 1/2011 | Holler | |
| 2011/0057500 A1* | 3/2011 | Walker et al. | 297/465 |
| 2012/0242134 A1* | 9/2012 | Siegel | 297/465 |
| 2012/0292893 A1 | 11/2012 | Baca et al. | |

FOREIGN PATENT DOCUMENTS

| | | |
|---|---|---|
| CA | 2112960 | 7/1994 |
| CA | 2450744 | 2/2003 |
| DE | 4019402 | 12/1991 |
| DE | 4421688 | 12/1995 |
| DE | 69019765 | 2/1996 |
| EP | 26564 A1 | 4/1981 |
| EP | 0363062 | 4/1990 |
| EP | 0380442 | 8/1990 |
| EP | 0401455 | 12/1990 |
| EP | 0404730 | 12/1990 |
| EP | 0449772 | 10/1991 |
| EP | 0519296 | 12/1992 |
| EP | 0561274 | 9/1993 |
| EP | 0608564 | 8/1994 |
| EP | 1153789 | 11/2001 |
| EP | 1447021 | 8/2004 |
| FR | 1298012 | 7/1962 |
| GB | 888436 | 1/1962 |
| GB | 1047761 | 11/1966 |
| GB | 1582973 | 1/1981 |
| GB | 2055952 | 3/1981 |
| GB | 2356890 | 6/2001 |
| JP | 52055120 | 5/1977 |
| JP | 63141852 | 9/1988 |
| JP | 63247150 | 10/1988 |
| JP | 10119611 | 5/1998 |
| JP | 2001138858 | 5/2001 |
| WO | WO-8603386 | 6/1986 |
| WO | WO-03009717 | 2/2003 |
| WO | WO-2004004507 | 1/2004 |
| WO | WO-2006041859 | 4/2006 |
| WO | WO-2010/027853 | 3/2010 |

OTHER PUBLICATIONS

European Search Report & Written Opinion; European Patent Application No. EP 06772609.1; Applicant: AmSafe, Inc.; Date of Mailing: Apr. 21, 2011, 7 pages.

European Search Report & Written Opinion; European Patent Application No. EP 09704423; Applicant: AmSafe Commercial Products, Inc.; Date of Mailing: Mar. 22, 2011, 6 pages.

Final Office Action; U.S. Appl. No. 12/051,768, Mailing Date Nov. 12, 2010, 14 pages.

Final Office Action; U.S. Appl. No. 12/563,294, Mailing Date Sep. 30, 2011, 8 pages.

Final Office Action; U.S. Appl. No. 12/027,985, dated Jan. 27, 2012, 14 pgs.

Global Seating Systems LLC, "CCOPS," Cobra: Soldier Survival System, 1 page, undated. [Color Copy].

Holmbergs, "Gr.1 Buckle, 3/5 point." Accessed Sep. 15, 2010. www.holmbergs.se. (2 pages).

Holmbergs, "Gr. 0+ 3-point buckle with plastic chassi and tongues." Accessed Sep. 15, 2010. www. holmbergs.se. (1 page).

Holmbergs, "Gr. 1 Buckle, Viking." Accessed Sep. 15, 2010. www.holmbergs.se. (1 page).

Holmbergs, "Group 1 Systems." Accessed Sep. 15, 2010. www.holmbergs.se. (1 page).

Holmbergs, "Infant buckle with steel tongues." Accessed Sep. 15, 2010. www.holmbergs.se. (1 page).

Holmbergs, "Infant buckle. 5-point with plastic chassi and plastic tongues." Accessed Sep. 15, 2010. www.holmbergs.se. (1 page).

International Search Report and Written Opinion, PCT Application No. PCT/US2006/22367; Applicant: AmSafe, Inc.; Date of Mailing: Sep. 18, 2006, 6 pages.

International Search Report and Written Opinion; PCT Application No. PCT/US2009/31613; Applicant: AmSafe Commercial Products, Inc.; Date of Mailing: Mar. 3, 2009, 11 pages.

International Search Report and Written Opinion; PCT Application No. PCT/US2010/055475; Applicant: AmSafe Commercial Products, Inc.; Date of Mailing: Jan. 10, 2011, 11 pages.

Non-Final Office Action; U.S. Appl. No. 12/027,985, Mailing Date Dec. 22, 2010, 26 pages.

Non-Final Office Action; U.S. Appl. No. 12/357,356, Mailing Date Jul. 11, 2011, 34 pages.

Non-Final Office Action; U.S. Appl. No. 12/563,294, Mailing Date Apr. 11, 2011, 9 pages.

Non-Final Office Action; U.S. Appl. No. 12/027,985, Dated Aug. 25, 2011, 14 pgs.

Non-Final Office Action; U.S. Appl. No. 12/569,522, Dated Feb. 6, 2012, 13 pgs.

Non-Final Office Action; U.S. Appl. No. 12/917,898, dated Jun. 20, 2012, 14 pages.

Final Office Action dated Jan. 7, 2013; U.S. Appl. No. 12/917,898; 18 pages.

Non-Final Office Action dated Feb. 19, 2103; U.S. Appl. No. 13/492,584, 5 pages.

Novarace, "DL: Group 1 Buckle." Accessed Sep. 15, 2010. www.novarace.com. (1 page).

Novarace, "GT 3: Group 0 Buckle." Accessed Sep. 15, 2010. www.novarace.com (1 page).

Novarace, "GT 5: Group 0 Buckle." Accessed Sep. 15, 2010. www.novarace.com (1 page).

Novarace, "GT: Group 1 Buckle." Accessed Oct. 8, 2010. www.novarace.com. (1 page).

Novarace, "KMA 1: Group 1 Buckle." Accessed Sep. 15, 2010. www.novarace.com. (1 page).

Sabelt Catalog, "SAB104: Standard tongue hole to facilitate webbing insert," p. 23 (1 page).

(56) References Cited

OTHER PUBLICATIONS

Sabelt, "Daphne 0: Fiberglass-plastic buckle with metal pin latch." Accessed Sep. 15, 2010. www.sabelt.com (1 page).
Sabelt, "RO1000: Fiberglass-plastic buckle with metal pin latch." Accessed Sep. 15, 2010. www.sabelt.com (1 page).
Sabelt, "SAB004: Fiberglass-plastic buckle with metal pin latch." Accessed Sep. 15, 2010. www. sabelt.com. (1 page).
Sabelt, "SABUSA004: Fiberglass-plastic buckle with metal pin latch." Accessed Sep. 15, 2010. www.sabelt.com. (1 page).
Schroth Safety Products, Installation Instructions, HMMWV Gunner restraint, Single Lower with Swivel—M1151, Revision: A, Jul. 28, 2006, pp. 1-10.
Toltzman, Randall and Shaul, Rich; "Buckle Assembly"; U.S. Appl. No. 29/297,210, filed Nov. 6, 2007, electronic copy located at www.uspto.gov.
Non-Final Office Action dated Feb. 25, 2013; U.S. Appl. No. 13/441,689; 7 pages.
Amsafe, Inc., International Search Report and Written Opinion dated Mar. 2, 2012, International Application No. PCT/US2011/056776, 8 pages.
Non-Final Office Action, Dated Jan. 18, 2013, 12 pgs.
Non-Final Office Action, Dated Apr. 12, 2013, 7 pages.
Non-Final Office Action, Dated May 8, 2013, 9 pages.
Non-Final Office Action, Dated Jun. 20, 2013, 17 pages.

* cited by examiner

RESTRAINT HARNESSES AND ASSOCIATED METHODS OF USE AND MANUFACTURE

CROSS-REFERENCE TO RELATED APPLICATION(S)

This application claims priority to and the benefit of U.S. Provisional Patent Application No. 61/366,045, entitled RESTRAINT HARNESS AND ASSOCIATED METHODS OF USE AND MANUFACTURE, filed Jul. 20, 2010, and U.S. Provisional Patent Application No. 61/375,205, entitled RESTRAINT HARNESS AND ASSOCIATED METHODS OF USE AND MANUFACTURE, filed Aug. 19, 2010, which are incorporated herein by reference in their entireties.

TECHNICAL FIELD

The following disclosure is directed generally to personal restraint systems for use in vehicles and, more particularly, to restraint harnesses for use with land vehicles, air vehicles, and other vehicles.

BACKGROUND

Conventional restraint systems, such as those used in passenger vehicles, typically include one or more webs to restrain passengers in their seats. One type of restraint system, for example, includes a shoulder web and a lap web. Other restraint systems, such as restraint harnesses, include more than two webs (e.g., two shoulder webs, a lap web, and a crotch web) to more adequately restrain passengers during impacts that can cause dislocation of the passengers in the vertical direction. Military vehicles generally include these multiple web restraint harnesses because such vehicles can experience destructive forces (e.g., mines, improvised explosive devices, etc.) that can violently jolt and/or eject passengers from the vehicle. For example, high mobility multipurpose wheeled vehicles ("HMMWVs") typically include multiple web restraint harnesses to restrain turret gunners and prevent dislocation during an impact.

DETAILED DESCRIPTION

The present disclosure describes various embodiments of personal restraint harnesses for use with restraint systems in military land vehicles and other land, air, and sea vehicles. In one embodiment, for example, a restraint harness includes stiffened shoulder webs that enable quick and easy donning of the restraint harness and prevents the webs from tangling and/or twisting. As used herein, the term "web" can refer to various known types of straps or belts used with seat belts and other personal restraint systems. Such webs can include, for example, woven material (e.g., nylon, etc.) known in the art for use with personal restraint systems. In certain embodiments, the webs described herein can include segments of a fixed length and/or adjustable length to accommodate different sized wearers. Webs can be static and/or the distal ends of the webs can be operably coupled to one or more retractors (e.g., inertial reels) to provide adjustable lengths of the webs.

Certain details are set forth in the following description and in FIGS. 1-5C to provide a thorough understanding of various embodiments of the disclosure. Other details describing well-known structures and systems often associated with vehicle seats, webs, retractors, buckles and other personal restraint devices have not been set forth in the following disclosure to avoid unnecessarily obscuring the description of the various embodiments of the invention.

Many of the details, dimensions, angles, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Figure 1:
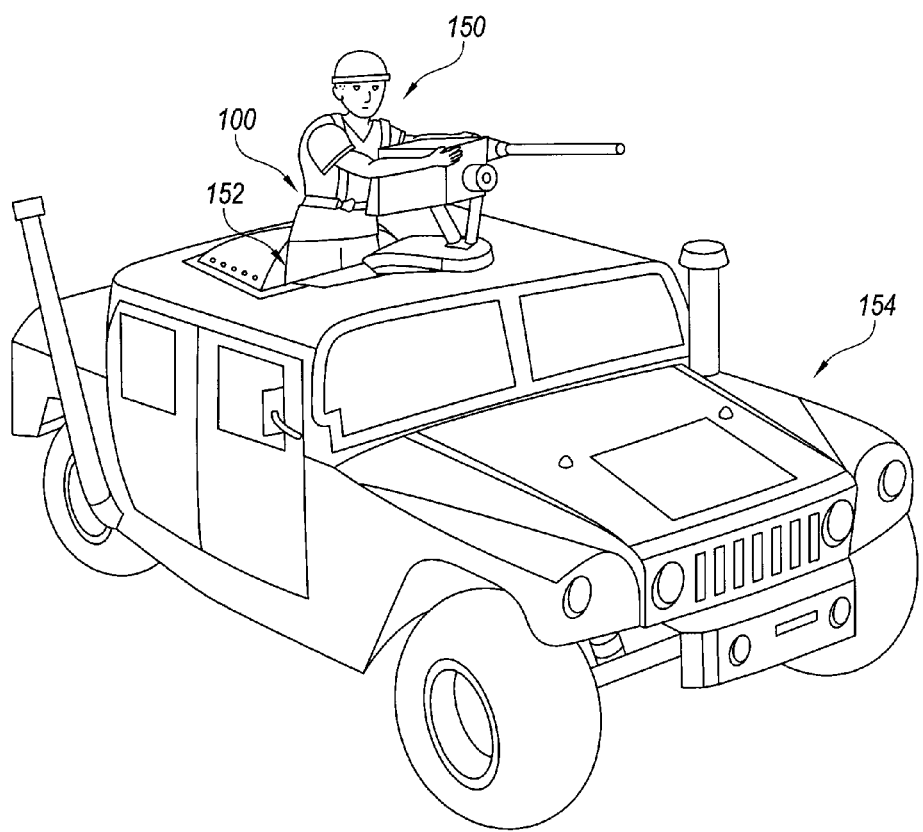
FIG. 1 is an isometric view of a turret gunner donning a restraint harness configured in accordance with an embodiment of the disclosure.

FIG. 1 is an isometric view of a gunner 150 wearing a restraint harness 100 ("harness 100") configured in accordance with an embodiment of the disclosure. The gunner 150 is positioned on a turret 152 of an HMMWV 154. The harness 100 can be fixedly and/or retractably connected to the HMMWV 154 in a known manner to prevent dislocation of the gunner 150. When detonation forces (e.g., an improvised explosive device, a mine, etc.) cause the HMMWV 154 to accelerate upwardly, the restraint harness 100 can secure the gunner 150 to the HMMWV 154 and prevent ejection. Additionally, the harness 100 can be flexible and nonrestrictive so that the gunner 150 can quickly change positions, such as from one shooting position to another and/or from inside to outside the HMMWV 154. In a further embodiment, the HMMWV 154 can include one or more harnesses 100 connected to interior seats to prevent violent vertical jostling and/or dislocation during impacts. In still further embodiments, the restraint harness 100 can be used in water vehicles, air vehicles, and non-military vehicles (e.g., personal restraints, automobile restraints, aircraft restraints, racing restraints, child restraints, parachute restraints, fall-protection restraints, aviation tie down restraints, etc.).

Figure 2:
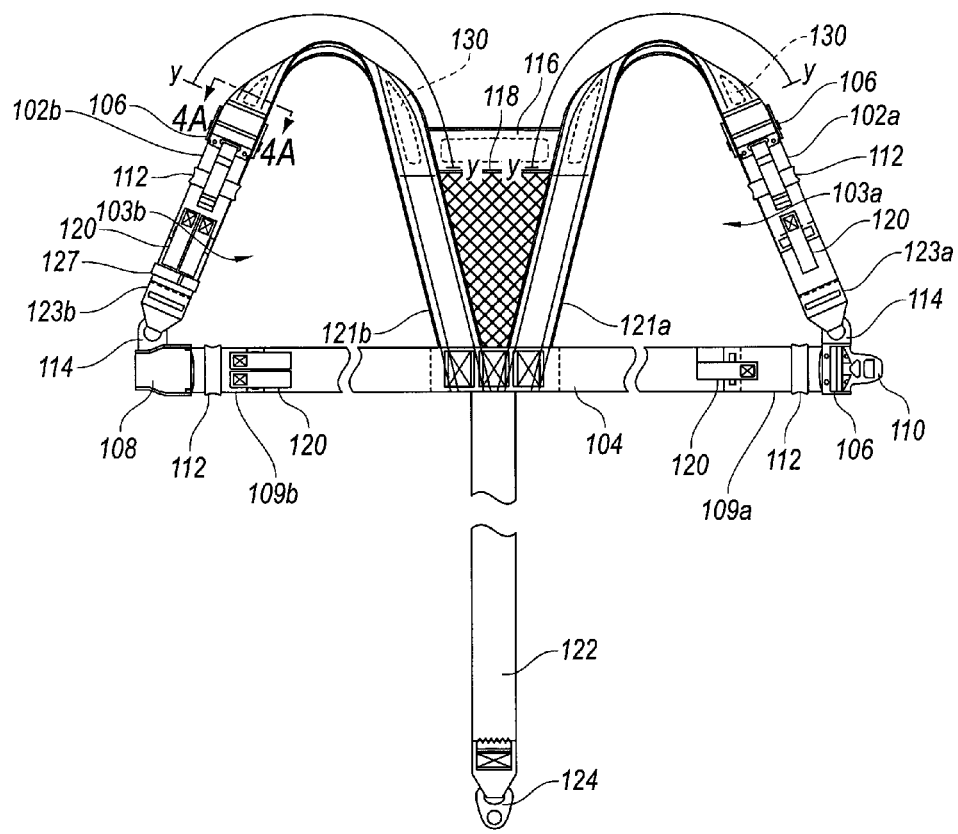
FIG. 2 is a back view of a restraint harness configured in accordance with an embodiment of the disclosure.
Figure 3:
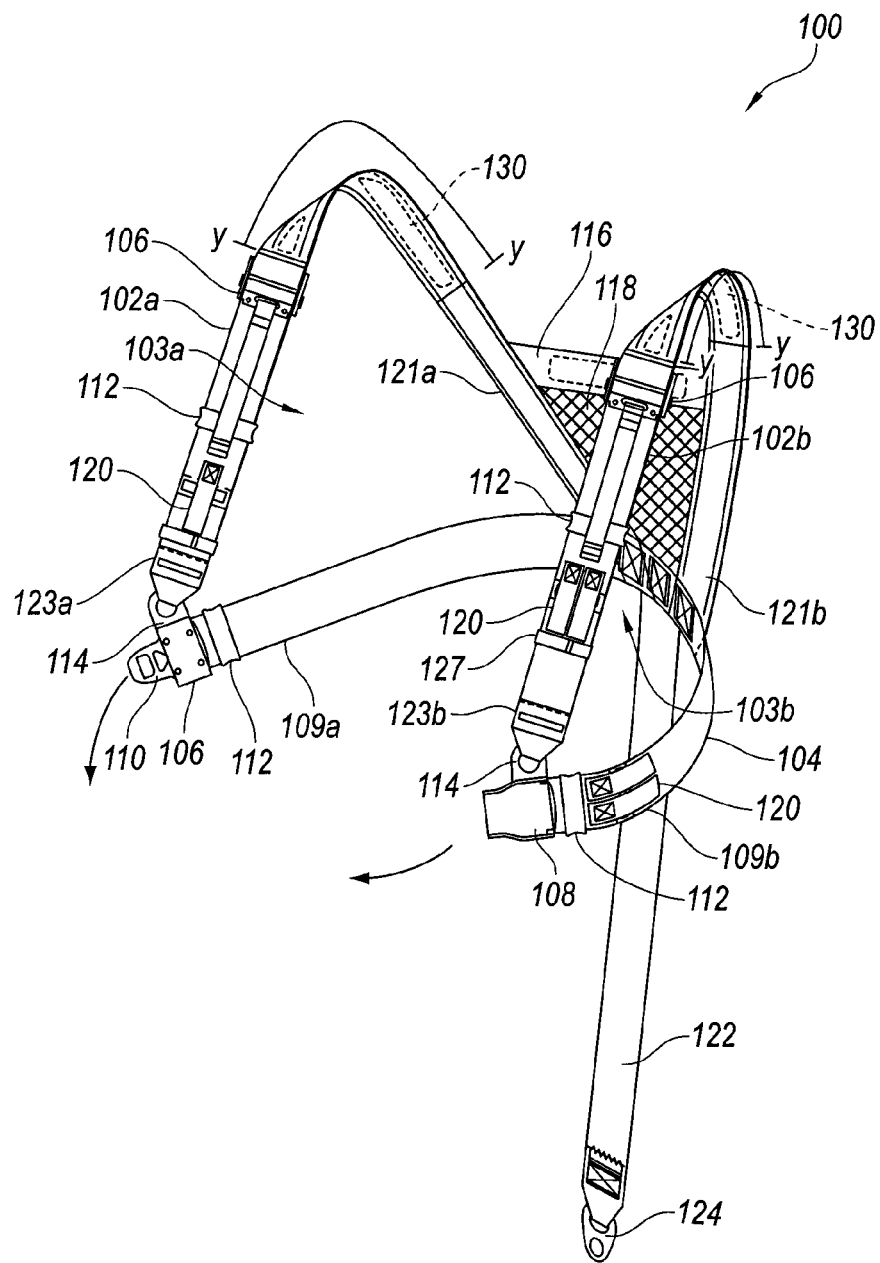
FIG. 3 is an isometric view of a restraint harness configured in accordance with an embodiment of the disclosure.

FIGS. 2 and 3 are back and isometric views, respectively, illustrating the harness 100 configured in accordance with an embodiment of the disclosure. In the illustrated embodiment, the harness 100 includes a first shoulder web 102a configured to extend over the right shoulder of a wearer (e.g., the right shoulder of the gunner 150 of FIG. 1), a second shoulder web 102b configured to extend over the left shoulder of the wearer, and a torso web 104 configured to extend around the wearer's torso. The shoulder webs 102 can restrain the wearer in a vertical direction. In other embodiments, the harness 100 can include a singular shoulder web 102 to provide the wearer with a greater range of motion. In further embodiments, the harness 100 can include multiple first shoulder webs 102a and/or multiple second shoulder webs 102b to further secure the wearer.

The shoulder webs 102 can include a stiffening material 130 that provides enough rigidity to form and shape the shoulder webs 102, while remaining flexible enough to substantially conform to the wearer's shoulders. The stiffening material 130, for example, can include spring steel, foam, molded plastic, formed metal pieces, additional layers of webbing, structural and/or nonstructural sewing, etc.

In one embodiment, the stiffening material 130 can extend within a portion of the shoulder webs 102, such as along portions denoted Y-Y. In this configuration, the stiffening material 130 can form the shoulder webs 102 into a shape corresponding to the shape the shoulder webs 102 take when in use (e.g., inverted U-like shape). This allows the wearer to quickly identify the front, the back, and the inside of the harness 100. Additionally, the stiffened portion of the shoulder webs 102 can form openings 103 (identified individually as a first opening 103a and a second opening 103b) that make it relatively easy for the wearer to insert his or her arms into the harness 100. The wearer can don the harness 100, for example, by first inserting his or her right arm through the first preformed opening 103a created by the first shoulder web 102a and, despite the harness being obscured behind the wearer's back, the wearer can easily insert his or her left arm into the second preformed opening 103b created by the second shoulder web 102b. To further simplify donning, the stiffening material 130 can be configured to position the obscured second shoulder web 102b substantially outside and/or above the wearer's shoulder level. Additionally, the stiffened portions of the shoulder webs 102 are less likely to twist and/or tangle than conventional, non-structured webs. In other embodiments, the stiffening material 130 can extend within larger or smaller portions of the shoulder webs 102 and/or can form the shoulder webs 102 into different shapes. In one embodiment, for example, the stiffening material 130 can extend through the entire length of the shoulder webs 102.

The torso web 104 can include a buckle 108 and a connector 110 at opposing end portions 109 (identified individually as a first end portion 109a and a second end portion 109b) configured to securely fasten the torso web 104 around the wearer's waist or chest. As will be apparent to those skilled in the art, the buckle 108 and the connector 110 can be any suitable assembly configured to fasten together at least two portions of a web. The torso web 104 can be fixedly and/or releasably attached to the shoulder webs 102. In the illustrated embodiment, first end portions 121a and 121b of the shoulder webs 102 are sewn to the torso web 104, and second end portions 123a and 123b of the shoulder webs 102 are coupled to the torso web 104 with fittings 114. In other embodiments, the shoulder webs 102 and the torso web 104 can be attached with different fastener systems including, for example, slides, buckles, etc. In another embodiment, the shoulder webs 102 and the torso web 104 can be integrally formed.

In various embodiments, the torso web 104 can include the stiffening material 130 to form the torso web 104 into a shape corresponding to the general shape the wearer's torso. The stiffened torso web 104 can differentiate the torso web 104 from other webs (e.g., the shoulder webs 102), and further simplify orientation of the harness 100 for donning by the wearer. The stiffened torso web 104 can also prevent twisting and/or tangling of the webs. Additionally, the stiffened torso web 104 can provide the wearer with quick location and orientation of the buckle 108 and the connector 110.

In the embodiment illustrated in FIGS. 2 and 3, the harness 100 further includes a back web 116 extending between the first shoulder web 102a and the second shoulder web 102b. The back web 116 and the shoulder webs 102 can be fixedly and/or releasably coupled together using various fastener systems known in the art including, for example, stitching, slides, buckles, fittings, glue, etc. In other embodiments, the back web 116 and the shoulder webs 102 can be integrally formed.

In one aspect of this embodiment, the back web 116 can also include stiffening material 130 to facilitate spacing the shoulder webs 102 apart from one another. The stiffened back web 116 forms the harness 100 into a shape that corresponds to its shape during use and, thus, further orients the harness 100 to facilitate donning by the wearer. Additionally, the stiffened portion of the back web 116 can also help reduce web entanglement.

As shown in FIGS. 2 and 3, the harness 100 can further include a back panel 118 positioned between the shoulder webs 102, the back web 116, and the torso web 104. The back panel 118 can be made from a mesh material (e.g., a nylon, etc.) to enhance ventilation, a solid material (e.g., a cotton, neoprene, etc.), the stiffening material 130, additional webs, padding, and/or other suitable materials. The back panel 118 can reduce the likelihood that the wearer will mistakenly place his or her arm into the opening created by the shoulder webs 102, the back web 116, and/or the torso web 104. In other embodiments, the harness 100 can include additional panels similar to the back panel 118 that cover superfluous openings and, thereby, orient the harness 100 for the wearer.

Additionally, as shown in the illustrated embodiment, the harness 100 can include a tail web 122 attached to the torso web 104. The tail web 122 and the torso web 104 can be attached together using any suitable fastening mechanisms (e.g., stitching, a buckle, etc.) and, in other embodiments, the tail web 122 can attach to other portions of the harness 100 (e.g., the shoulder webs 102, the back web 116, etc.). The tail web 122 can include an end fitting 124 that operably couples to a fixed and/or retractable engagement feature (e.g., a buckle, a hook, etc.) in the vehicle. In one embodiment, for example, the end fitting 124 can operably couple to a retractor having a pretentioner that allows the tail web 122 to change length during normal vehicle operations (e.g., driving, parking, etc.), and tightens the tail web 122 in a fixed position during an impact. Accordingly, the tail web 122 can be configured to secure the wearer restrained by the harness 100 to a vehicle (e.g., a HMMWV, a rotorcraft, a boat, etc.) and reduce dislocation and/or substantial vertical movement of the wearer. One skilled in the art will recognize that the end fitting 124 can be any type of connector that can adequately secure the harness 100 to a vehicle.

The harness 100 can further include a retainer clip 127 configured to releasably retain the end fitting 124 when it is uncoupled from the vehicle. The retainer clip 127 can prevent the loose tail web 122 and the end fitting 124 from entangling with the harness 100, catching on the surroundings, and/or damaging nearby objects. Additionally, the retainer clip 127 can position the uncoupled end fitting 124 in a location that is easy for a wearer to find and grasp, such as on the front of the harness 100. The features of the retainer clip 127 are described in more detail with reference to FIGS. 6A-7B.

In various aspects of the disclosure, the harness 100 can further include one or more adjusters 106 and/or one or more web slides 112. The adjusters 106 can be configured to extend or shorten the webs (e.g., the shoulder webs 102, the torso web 104, etc.) for different sized wearers, and can be any suitable adjuster known in the art for use with a restraint system. The web slides 112 configured to secure loose and/or extra webbing, and can be any suitable web slide for use with restraint systems. In alternative embodiments, loose and/or extra webbing can be secured by a different fastener (e.g., Velcro) or the web slides 112 can be omitted. A person skilled in the art will recognize that the adjusters 106 and the web slides 112 can be made out of any suitable material, such as plastic, rubber, metal, etc.

Additionally, as shown in FIG. 3, the harness 100 can further include one or more pull tabs 120 that orient the harness 100 for the wearer. In the illustrated embodiment, the first shoulder web 102a and the first end portion 109a of the torso web 104 includes one pull tab 120, and the second shoulder web 102b and a second end portion 109b of the torso web 104 includes two pull tabs 120. By glancing at the pull tabs 120, the wearer can easily determine which shoulder web 102 corresponds to which side of the torso web 104. In other embodiments, the shoulder webs 102 and/or the torso web 104 can include other identifying features that orient the harness 100 for the wearer. For example, the shoulder webs 102 and the torso web 104 can include an "L" and an "R" stitched into the webbing to demarcate a left and a right side of the harness 100.

In still further embodiments, the harness 100 can include one or more additional webs. For example, the harness 100 can include a crotch web configured to extend between the wearer's legs and further secure the wearer in the harness 100. Each additional web can include the stiffening material 130 to form the webs and prevent the webs from tangling and/or twisting.

As shown in FIG. 3, the stiffening material 130 extends within a portion of the shoulder web 102 along the curve Y-Y to form the shoulder webs 102 into an upside-down U-like shape. The wearer can easily orient the harness 100 because the stiffened portions of shoulder webs 102 create an identifiable shape and reduce twisting and tangling of the webs (e.g., the shoulders webs 102, the torso web 104, the tail web 122, etc.). In use, the wearer can insert one of his or her arms into one of the preformed openings 103 created by the stiffened portion of the shoulder webs 102, and can easily locate and insert his or her other arm into the preformed opening 103 created by the stiffened portion of the other shoulder web 102. Additionally, the wearer does not have to blindly search behind his or her back for the other shoulder web 102 because the stiffening material 130 can form the shoulder webs 102 outward and upward to ease insertion of the wearer's arms. The back web 116 can also aid in more effectively positioning the shoulder webs 102 by spacing them apart from one another. Moreover, the back panel 118 can prevent the wearer from accidentally inserting his or her arms into the incorrect opening. After inserting both arms into the harness 100, the wearer can encircle the torso web 104 around his or her torso (e.g., the chest, the waist, etc.) and engage the connector 110 with the buckle 108. If necessary, the wearer can tighten and/or loosen the harness 100 with the adjusters 106 and secure any loose webbing with the web slides 112. The tail web 122 can be secured to a vehicle, and therefore the harness 100 can reduce vertical displacement of the wearer.

Figure 4A:
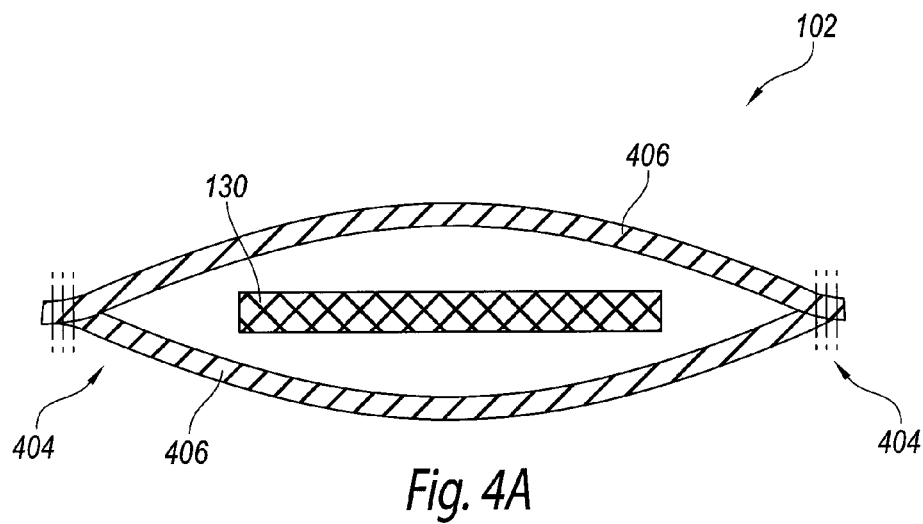
FIG. 4A is a cross-sectional view of a shoulder web of FIG. 2 taken substantially along line 4A-4A of FIG. 2 and configured in accordance with an embodiment of the disclosure.
Figure 4B:
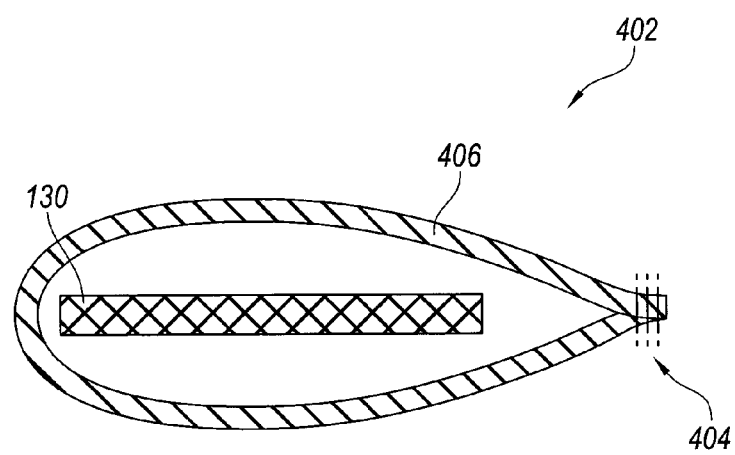
FIG. 4B is a cross-sectional view of a shoulder web configured in accordance with another embodiment of the disclosure.

FIG. 4A is a cross-sectional view taken substantially along line 4A-4A of FIG. 2. In the illustrated embodiment, the shoulder web 102 includes outer layers of webbing 406 that form a sleeve around the stiffening material 130 (e.g., a strip of spring steel, foam, etc.). The edges of the outer layers 406 can be joined by stitching 404 and/or other suitable fasteners (e.g., staples, glue, etc.). In other embodiments, the stiffening material 130 can be encapsulated by more or less outer layers of webbing 406. FIG. 4B, for example, is a cross-sectional view of a shoulder web 402 configured in accordance with another embodiment of the present disclosure. In FIG. 4B, one outer layer of webbing 406 of the shoulder web 402 wraps around the stiffening material 130, and stitching 404 secures distal end portions of the outer layer of webbing 406 together.

In further embodiments, the shoulder web 102 can made from the stiffening material itself. The shoulder web 102 can include, for example, spring steel integrated throughout the webbing. In still further embodiments, the shoulder web 102 can include additional layers of webbing, rubber, structural sewing, nonstructural sewing, and/or other suitable features that stiffen portions of the webbing. A person skilled in the art will recognize that the embodiments of the shoulder web 102 described with reference to FIGS. 4A and 4B can be applied to other features of the harness 100 including, for example, the torso web 104, the back web 116, and the back panel 118.

Figure 5A:
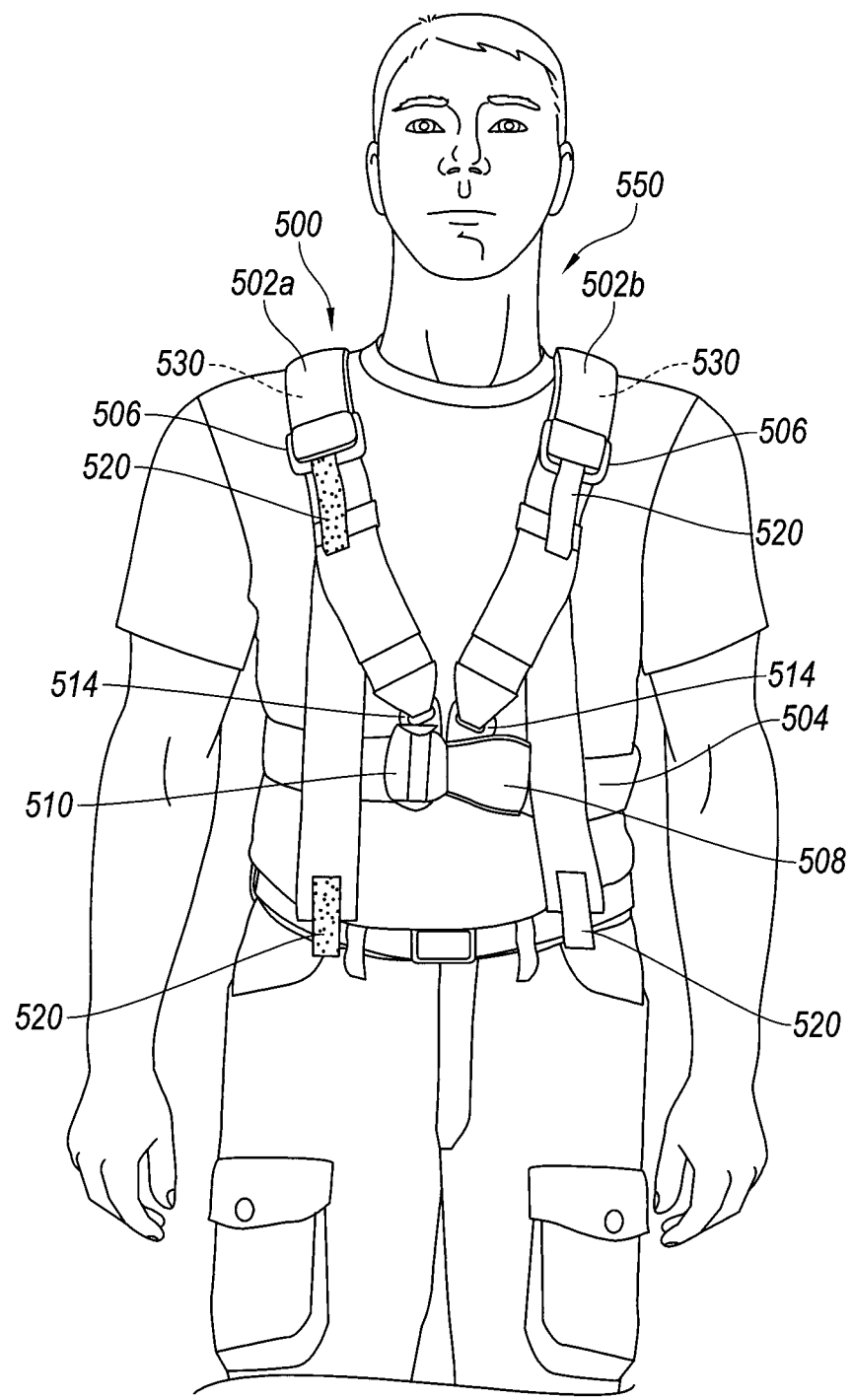
FIGS. 5A-5C are front, side, and back views, respectively, illustrating a wearer donning a restraint harness configured in accordance with an embodiment of the disclosure.
Figure 5B:
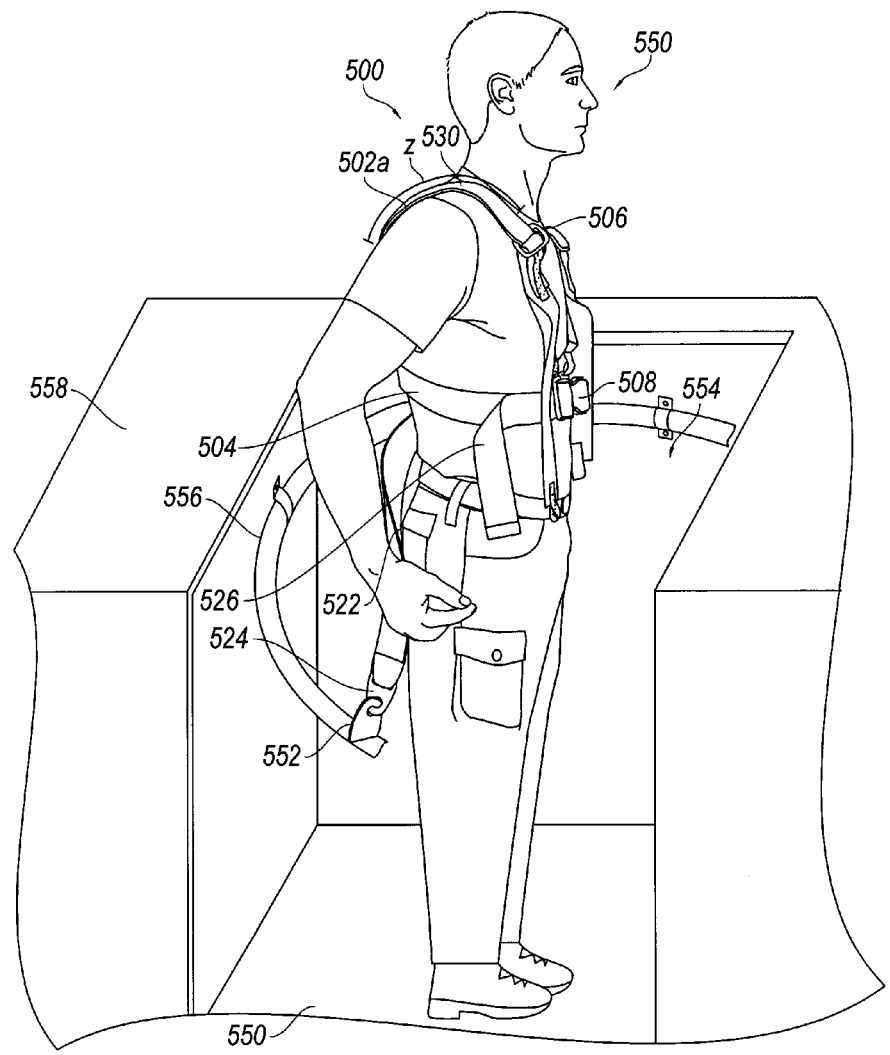
Figure 5C:
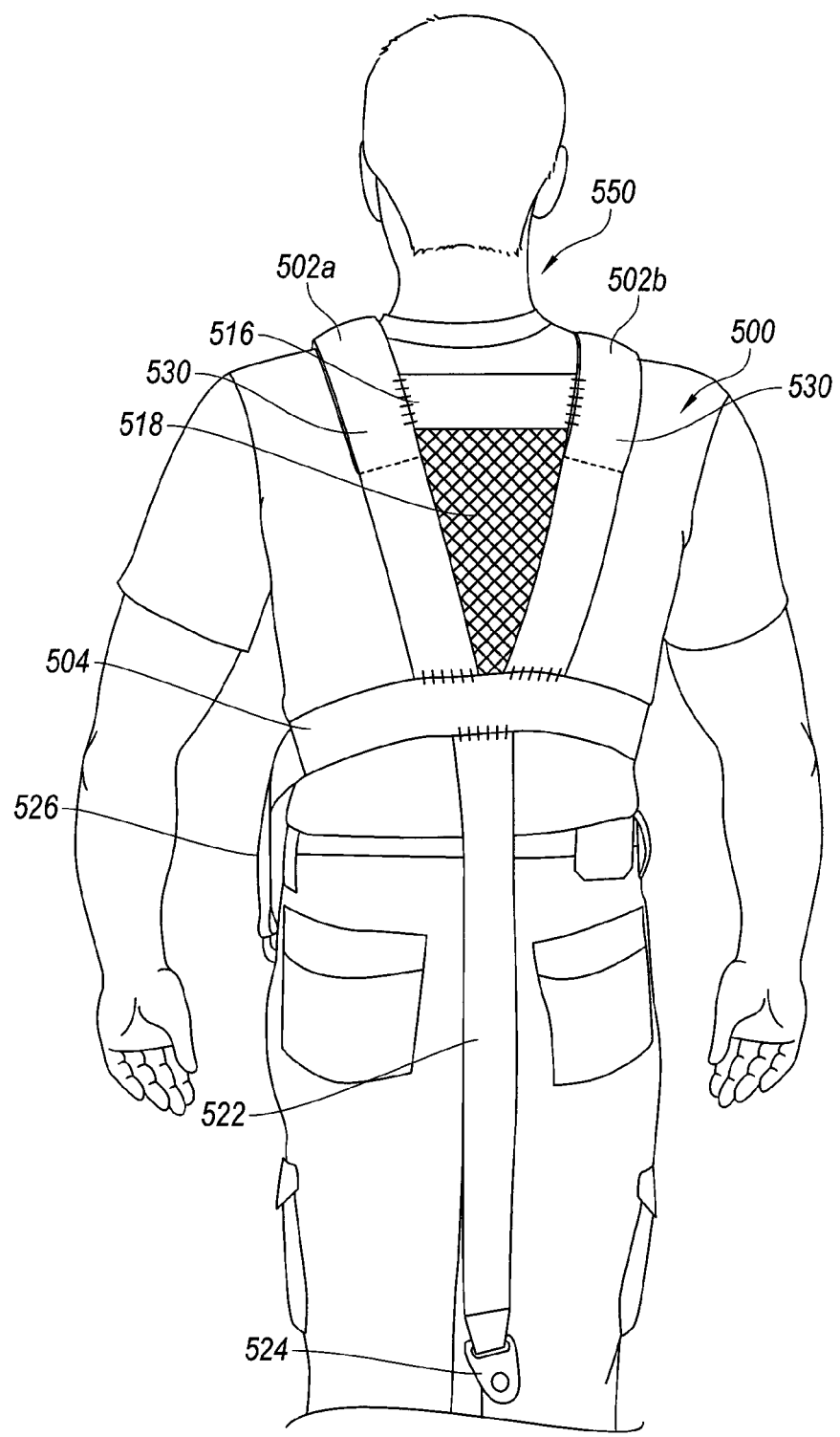

FIGS. 5A-5C are illustrations of a wearer donning a restraint harness configured in accordance with an embodiment of the disclosure. For example, FIG. 5A is a front view of a wearer 550 donning a restraint harness 500 ("harness 500"), similar to the restraint harness 100 described above. The restraint harness 500 includes a first shoulder web 502a extending over the wearer's right shoulder and a second shoulder web 502b extending over the wearer's left shoulder. The shoulder webs 502 include a stiffening material 530, such as the stiffening material 130 described above, that forms the shoulder webs 502 into identifiable shoulder-like shapes and prevents the harness 500 from twisting and tangling. The shoulder webs 502 further include adjusters 506 configured to accommodate the size of the wearer 550 and differently colored pull tabs 520 configured to orient the harness 500 for the wearer 550. The harness 500 further includes a torso web 504 that encircles the wearer's waist. The two distal ends of the torso web 504 are fixedly and/or slidably attached to a buckle 508 and a connector 510. The buckle 508 is configured to engage the connector 510 to secure the wearer 550 in the harness 500. The shoulder webs 502 include fittings 514 that engage with an engagement feature (not visible) coupled to the torso web 504.

Referring now to FIG. 5B, the side view of the wearer 550 donning the harness 500 illustrates the stiffening material 530 within a portion of the second shoulder web 502a extending along a curve Z-Z. The portion including the stiffening material 530 is more structured than the limp web ends 526 dangling from the torso web 504. As shown, the stiffening material 530 still provides the shoulder web 502a with at least enough flexibility to conform to the wearer's shoulder. Additionally, FIG. 5B shows a tail web 522 attached to the torso web 504 and an end fitting 524 attached to the tail web 522. The end fitting 524 can be releasably coupled to an engagement feature 552 (e.g., a buckle, a retractor, clip, etc.) attached to a portion of a vehicle to prevent dislocation and/or substantial vertical movement of the wearer 550 in response to rapid movement of the vehicle. In the illustrated embodiment, for example, the engagement feature 552 is positioned on a rail 556 proximate a turret gunner position 554 of a vehicle 558 (e.g., an HMMWV, military jet, etc.). The engagement feature 552 can slide along the rail 556 to facilitate rotational movement of the turret gunner (i.e., the wearer 550) and the harness 100 coupled thereto can restrain the vertical displacement of the turret gunner during sudden impacts. In other embodiments, the engagement feature 552 can be coupled to stationary portions of the vehicle 558 (e.g., the floor of the vehicle 558) and/or proximate other positions in the vehicle 558 (e.g., the driver position).

FIG. 5C illustrates a back view of the wearer 550 donning the harness 500. As shown, a back web 516 can be sewn to the shoulder webs 502, and can include stiffening material 530 to provide further structure to the harness 500. The back view further illustrates a back panel 518 attached to the back web 516, the shoulder webs 502, and the torso web 504. In this embodiment, the back panel 518 is made of mesh to provide flexibility and ventilation, while also preventing the wearer 550 from inserting his arm into an incorrect opening.

Figure 6A:
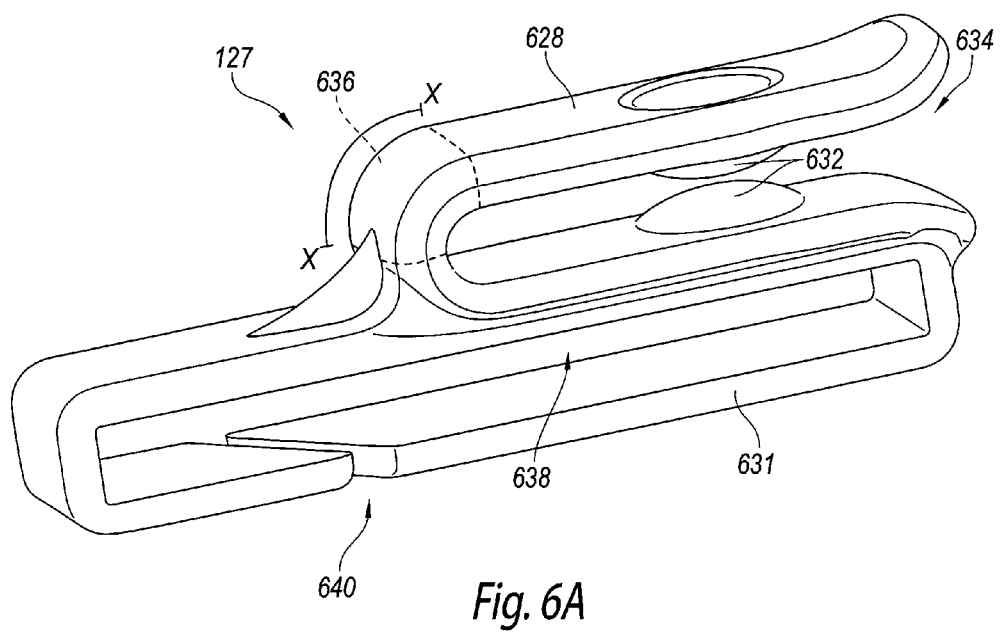
FIG. 6A is an enlarged isometric view of a retainer clip for releasably retaining an end fitting configured in accordance with an embodiment of the disclosure.
Figure 6B:
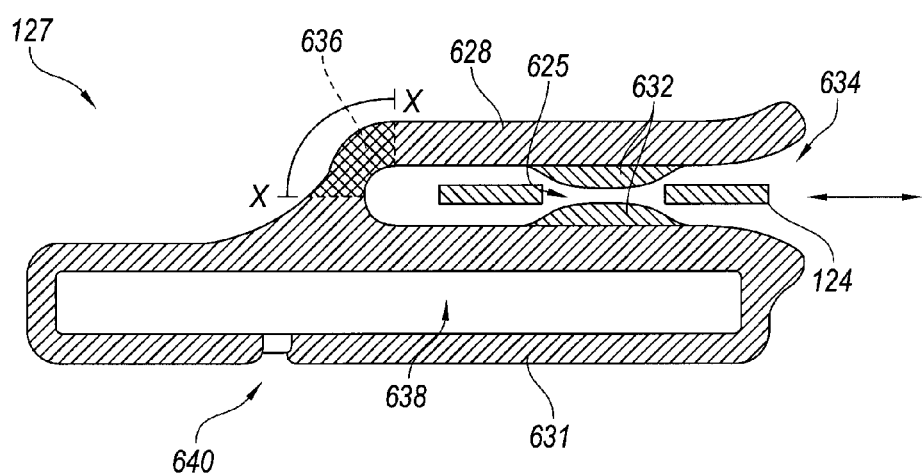
FIG. 6B is a cross-sectional view of the retainer clip of FIG. 6A.

FIG. 6A is an enlarged isometric view of the retainer clip 127 configured in accordance with an embodiment of the disclosure, and FIG. 6B is a cross-sectional view of the retainer clip 127. Referring to FIGS. 6A and 6B together, the retainer clip 127 can include an engagement feature 628 and an attachment feature 631. The engagement feature 628 can be configured to releasably retain the end fitting 124. In the illustrated embodiment, the engagement feature 628 includes an opening 634 having a pair of opposing protrusions 632 that can receive and engage at least a portion of the end fitting 124. The protrusions 632 can include bumps that engage an opening 625 of the end fitting 124 (FIG. 6B). In other embodiments, the protrusions 632 can have suitable shapes (e.g., a hook, cone, etc.) and/or the engagement feature 628 can include more or less protrusions 632. The retainer clip 127 can be formed and/or molded from a flexible and/or semi-rigid material. The retainer clip 127 can comprise, for example, rubber, plastic, and/or another suitable material. In other embodiments, the retainer clip 127 can comprise a rigid material, such as a metal. In further embodiments, portions of the retainer clip 128, such as the protrusions 632, can be made from a magnetic material (e.g., iron, nickel, cobalt, etc.) to enhance the engagement of the end fitting 124.

In various embodiments, the engagement feature 628 can further include a spring portion 636 configured to increase the flexibility and/or resiliency of the engagement feature 628 and, thus, ease retaining and/or releasing the end fitting 124. In the illustrated embodiment, the spring portion 636 extends along a section of the engagement feature 628 denoted X-X. In other embodiments, the spring portion 636 can extend within a different portion of the engagement feature 628 and/or the retainer clip 127. In further embodiments, the engagement feature 628 can releasably secure another portion of the end fitting 124 and/or the tail web 122.

The attachment feature 631 can be configured to secure the retainer clip 127 to a portion of a restraint harness (e.g., the harness 100 of FIGS. 2 and 3). In the illustrated embodiment, the attachment feature 631 defines an opening 638 configured to receive at least a portion of a web (e.g., the shoulder webs 102 or the torso web 104 of FIGS. 2 and 3) to attach the retainer clip 127 on the web. The attachment feature 631 can optionally include a slot 640 that can facilitate installing the attachment feature 631 on the web during and/or after manufacturing of the restraint harness. In other embodiments, the attachment feature 631 can include snaps, stitching, glue, and/or other suitable mechanisms for mounting the retainer clip 127 to a web. In further embodiments, the attachment feature 631 can be used to mount the retainer clip 127 on another portion of the harness 100, such as hardware (e.g., the buckle 108 of FIGS. 2 and 3).

In operation, the retainer clip 127 can be used to releasably retain the end fitting 124 when it is uncoupled from a vehicle to prevent the end fitting 124 and/or the loose tail web 122 from swinging about unrestrained. Additionally, the retainer clip 127 can secure the end fitting 124 in an easily accessible position that can further simplify orientation of the harness 100 for donning by the wearer.

Figure 7A:
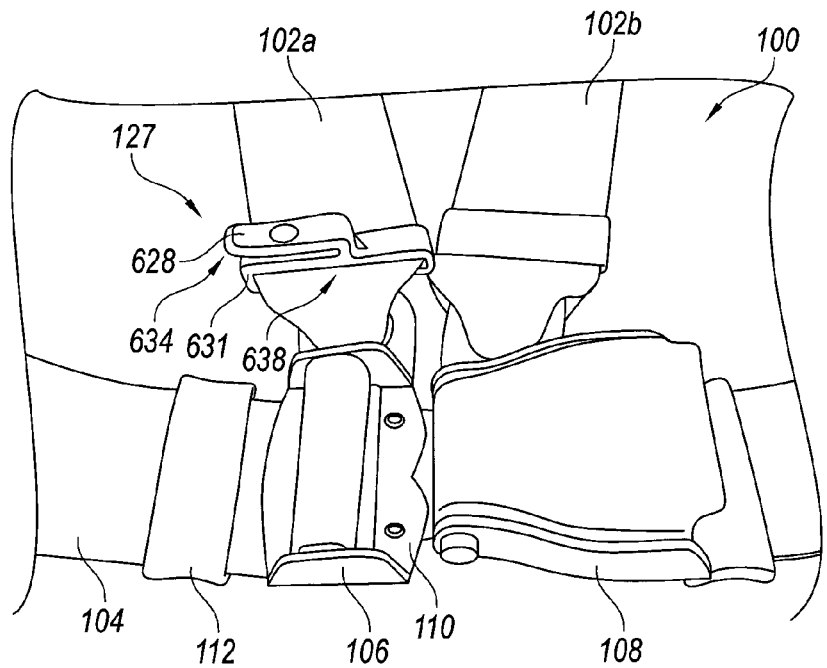
FIG. 7A is a front view illustrating the retainer clip of FIGS. 6A and 6B installed on a harness and configured in accordance with an embodiment of the disclosure.
Figure 7B:
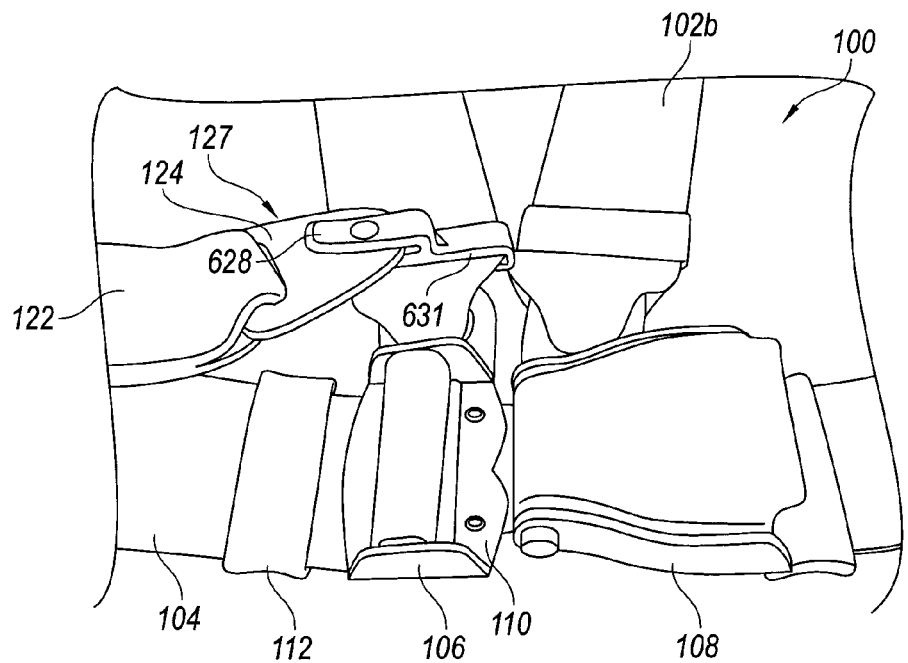
FIG. 7B is a front view illustrating the retainer clip releasably retaining an end fitting.

FIGS. 7A and 7B are front views illustrating the retainer clip 127 attached to the shoulder web 102a of the restraint harness 100 (FIGS. 2 and 3) in accordance with an embodiment of the disclosure. FIG. 7A illustrates the retainer clip 127 detached from the end fitting 124. The shoulder web 102b passes through the opening 638 defined by the attachment feature 631 to secure the retainer clip 127 to the harness 100 and to provide an easily accessible place for a wearer to secure and locate the end fitting 124. In FIG. 7B, the end fitting 124 is releasably retained by the retainer clip 127. The opening 634 of the engagement feature 628 receives the end fitting 124 and the protrusions 632 (not visible) engage at least a portion of the end fitting 124 to secure the tail web 122 and the end fitting 124 when they are uncoupled from a vehicle.

Figure 8:
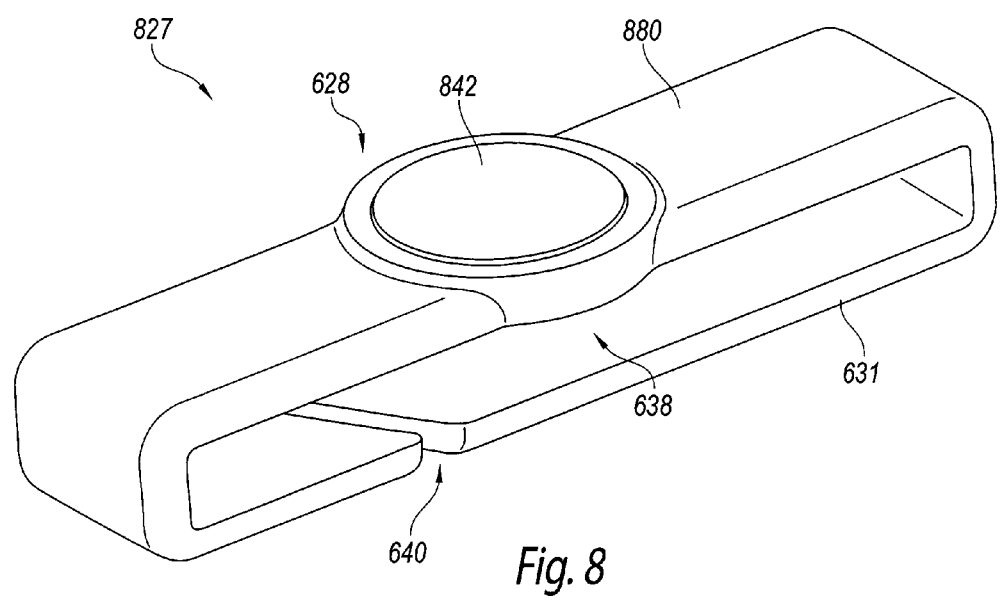
FIG. 8 is an isometric view of a retainer clip for releasably retaining an end fitting configured in accordance with another embodiment of the disclosure.

FIG. 8 is an enlarged isometric view of a retainer clip 827 configured in accordance with another embodiment of the disclosure. Several features of the retainer clip 827 are generally similar to the features of the retainer clip 127 described in FIGS. 6A-7B, and are accordingly not described in detail below. In FIG. 8, the engagement feature 628 of the retainer clip 127 includes a magnet 842 that can releasably retain an end fitting, such as the end fitting 124 described above. The magnet 842 can attach to an outer surface 880 of the retainer clip 827 using an adhesive, seal press, and/or another attachment mechanism known to those skilled in the art. The magnet 842 can be made from a ferromagnetic material (e.g., iron, nickel, cobalt, etc.) that can attract and secure a magnetic portion of the end fitting 124 when it is uncoupled from a vehicle. In various embodiments, the engagement feature 628 can include the magnet 842 and opposing protrusions, such as the protrusions 632 described in FIGS. 6A and 6B, to further secure the end fitting 124.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A restraint system, comprising:
   a first shoulder web having a first end portion opposite a second end portion;
   a second shoulder web having a first end portion opposite a second end portion;
   a torso web coupled to the first and second end portions of the first and second shoulder webs, wherein a first end portion of the torso web is coupled to a buckle configured to engage a connector coupled to a second, opposite end portion of the torso web;
   a first portion of a stiffening material attached to a first portion of the first shoulder web;
   a second portion of the stiffening material attached to a second portion of the second shoulder web, wherein the stiffening material forms the first and second shoulder webs into preformed openings with inverted U-shapes;
a tail web coupled to the torso web, the tail web having an end fitting configured to releasably engage an engagement feature on a vehicle; and
a retainer clip having an engagement feature, wherein the engagement feature of the retainer clip includes an opening configured to receive the end fitting and at least two opposing protrusions extending into the opening, and wherein the engagement feature of the retainer clip is configured to releasably retain the end fitting between the at least two opposing protrusions.

2. The restraint system of claim 1 wherein the stiffening material comprises at least one of spring steel, foam, molded plastic, formed metal pieces, layers of webbing, and structural sewing.

3. The restraint system of claim 1 wherein the first and second shoulder webs each include an outer layer of webbing substantially enclosing the stiffening material.

4. The restraint system of claim 1, wherein the encasement feature of the retainer clip is a first engagement feature, and wherein the end fitting is configured to releasably engage a second engagement feature on the vehicle proximate a turret gunner position.

5. The restraint system of claim 1 wherein the engagement feature further comprises a spring portion extending at least partially between the at least two opposing protrusions.

6. A restraint system, comprising:
a first shoulder web having a first end portion opposite a second end portion;
a second shoulder web having a first end portion opposite a second end portion;
a torso web coupled to the first and second end portions of the first and second shoulder webs, wherein a first end portion of the torso web is coupled to a buckle configured to engage a connector coupled to a second, opposite end portion of the torso web;
a first portion of a stiffening material attached to a first portion of the first shoulder web;
a second portion of the stiffening material attached to a second portion of the second shoulder web, wherein the stiffening material forms the first and second shoulder webs into preformed openings with inverted U-shapes;
a tail web coupled to the torso web, the tail web having an end fitting configured to releasably engage an engagement feature on a vehicle; and
a retainer clip attached to at least one of the first shoulder web, the second shoulder web, and the torso web, wherein the retainer clip includes a magnet configured to releasably retain the end fitting.

7. The restraint system of claim 6 wherein the first and second portions of the stiffening material are configured to facilitate insertion of a wearer's arms into the preformed openings.

8. The restraint system of claim 6, further comprising:
a back web between the first and second shoulder webs, wherein the first and second shoulder webs and the back web form an opening; and
a back panel substantially covering the opening.

9. The restraint system of claim 6, further comprising:
a first identifying feature on the first shoulder web and on a portion of the torso web proximate to the first shoulder web; and
a second identifying feature on the second shoulder web and on a portion of the torso web proximate to the second shoulder web, wherein the second identifying feature is different from the first identifying feature.

10. A restraint system, comprising:
a first shoulder web having a first end portion opposite a second end portion;
a second shoulder web having a first end portion opposite a second end portion;
a torso web coupled to the first and second end portions of the first and second shoulder webs, wherein a first end portion of the torso web is coupled to a buckle configured to engage a connector coupled to a second, opposite end portion of the torso web;
a first portion of a stiffening material attached to a first portion of the first shoulder web;
a second portion of the stiffening material attached to a second portion of the second shoulder web, wherein the stiffening material forms the first and second shoulder webs into preformed openings with inverted U-shapes;
a tail web extending from the torso web, wherein the tail web includes an end fitting configured to releasably engage an engagement feature on a vehicle;
a back web between the first and second shoulder webs, wherein the first and second shoulder webs and the back web form an opening;
a back panel substantially covering the opening, wherein the back panel comprises a mesh material;
a retainer clip having an engagement feature and an attachment feature, wherein the engagement feature of the retainer clip is configured to releasably retain the end fitting, and wherein the attachment feature is configured to mount the retainer clip on at least one of the first shoulder web, the second shoulder web, and the torso web;
a first identifying feature on the first shoulder web and on a portion of the torso web proximate to the first shoulder web;
a second identifying feature on the second shoulder web and on a portion of the torso web proximate to the second shoulder web, wherein the first identifying feature is different from the second identifying feature; and
wherein the stiffening material comprises spring steel.

11. A restraint system, comprising:
a first shoulder web configured to receive a right shoulder of a wearer, wherein a portion of the first shoulder web includes a first portion of a stiffening material, and wherein the stiffening material is configured to preform the first shoulder web into a shape substantially corresponding to a shape the first shoulder web takes when in use;
a second shoulder web configured to receive a left shoulder of the wearer, wherein a portion of the second shoulder web comprises a second portion of the stiffening material, wherein the stiffening material is configured to preform the second shoulder web into a shape substantially corresponding to a shape the second shoulder web takes when in use; a torso web coupled to distal end portions of the first and second shoulder webs, wherein the torso web is configured to releasably engage around a portion of the wearer's torso;
a tail web coupled to the torso web, the tail web having an end fitting configured to releasably engage a portion of a vehicle; and
a retainer clip having an engagement feature, wherein the engagement feature includes an opening configured to receive the end fitting and at least two opposing protrusions extending into the opening, and wherein the engagement feature of the retainer clip is configured to releasably retain the end fitting between the opposing protrusions.

12. The restraint system of claim 11 wherein the stiffening material comprises at least one of spring steel, foam, molded plastic, formed metal pieces, additional layers of webbing, and structural sewing.

13. The restraint system of claim 11 wherein the end fitting of the tail web is configured to releasably engage a feature proximate a turret gunner position of the vehicle.

14. The restraint system of claim 11 wherein the retainer clip has an attachment feature configured to mount the retainer clip to an easily accessibly portion of the restraint system.

15. The restraint system of claim 11, further comprising:
a back web; and
a back panel positioned between the back web and the first and second shoulder webs.

16. The restraint system of claim 11, further comprising identifying features on the first and second shoulder webs, wherein the identifying features are configured to distinguish the first shoulder web from the second shoulder web.

17. A method of making a restraint harness, comprising:
attaching a first portion of a stiffening material to a first portion of a first shoulder web, wherein the stiffening material shapes the first portion of the first shoulder web into an inverted U-shape to define a first preformed opening;
attaching a second portion of the stiffening material to a second portion of a second shoulder web, wherein the stiffening material shapes the second portion of the second shoulder web into an inverted U-shape to define a second preformed opening; and
attaching the first and second shoulder webs to a torso web, the torso web having a buckle at a first distal end portion and a connector at a second distal end portion, wherein the buckle is configured to engage the connector,
wherein the step of attaching the first and second portions of the stiffening material to the respective first and second portions of the respective first and second shoulder webs further comprises integrating a spring steel through the first and second portions of the first and second shoulder webs.

18. The method of claim 17 wherein:
the step of attaching the first portion of the stiffening material to the first portion of the first shoulder web comprises enclosing the stiffening material with a first outer layer of webbing; and
the step of attaching the second portion of the stiffening material to the second portion of the second shoulder web comprises enclosing the stiffening material with a second outer layer of webbing.

19. A method of making a restraint harness, comprising:
attaching a first portion of a stiffening material to a first portion of a first shoulder web, wherein the stiffening material shapes the first portion of the first shoulder web into an inverted U-shape to define a first preformed opening;
attaching a second portion of the stiffening material to a second portion of a second shoulder web, wherein the stiffening material shapes the second portion of the second shoulder web into an inverted U-shape to define a second preformed opening;
attaching the first and second shoulder webs to a torso web, the torso web having a buckle at a first distal end portion and a connector at a second distal end portion, wherein the buckle is configured to engage the connector;
attaching a tail web to at least one of the torso web, the first shoulder web, and the second shoulder web, the tail web having an end fitting configured to engage an engagement feature of a vehicle; and
attaching a retainer clip to at least one of the first shoulder web, the second shoulder web, and the torso web, wherein the retainer clip includes an engagement feature configured to releasably retain the end fitting.

20. The method of claim 19, further comprising:
attaching a back web between the first and second shoulder webs, wherein the first and second shoulder webs and the back web form an opening; and
positioning a back panel at least substantially over the opening.

21. The method of claim 19, further comprising:
attaching a first identifying feature to the first shoulder web and on a first portion of the torso web proximate to the first shoulder web; and
attaching a second identifying feature on the second shoulder web and on a second portion of the torso web proximate to the second shoulder web, wherein the first identifying feature is different from the second identifying feature.

* * * * *